(12) United States Patent
Tochihara et al.

(10) Patent No.: US 10,786,928 B2
(45) Date of Patent: Sep. 29, 2020

(54) POLYAMIDE PELLETS, METHOD FOR PRODUCING POLYAMIDE PELLETS, AND METHOD FOR PRODUCING POLYAMIDE MOLDED ARTICLE

(71) Applicant: Mitsubishi Gas Chemical Company, Inc., Tokyo (JP)

(72) Inventors: Tatsuya Tochihara, Niigata (JP); Katsumi Shinohara, Niigata (JP); Kaname Sato, Kanagawa (JP); Tomonori Kato, Kanagawa (JP); Jun Mitadera, Tokyo (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 542 days.

(21) Appl. No.: 15/329,793

(22) PCT Filed: Jul. 23, 2015

(86) PCT No.: PCT/JP2015/070946
§ 371 (c)(1),
(2) Date: Jan. 27, 2017

(87) PCT Pub. No.: WO2016/017518
PCT Pub. Date: Feb. 4, 2016

(65) Prior Publication Data
US 2017/0210031 A1 Jul. 27, 2017

(30) Foreign Application Priority Data

Jul. 30, 2014 (JP) ................................ 2014-155025
Jul. 30, 2014 (JP) ................................ 2014-155034
Jul. 30, 2014 (JP) ................................ 2014-155039

(51) Int. Cl.
*B29C 45/47* (2006.01)
*B29B 9/10* (2006.01)
*C08G 69/30* (2006.01)
*C08J 3/12* (2006.01)
*B29B 7/42* (2006.01)
*B29B 9/12* (2006.01)
*C08G 69/26* (2006.01)
(Continued)

(52) U.S. Cl.
CPC .................. *B29B 9/10* (2013.01); *B29B 7/42* (2013.01); *B29B 7/429* (2013.01); *B29B 9/065* (2013.01);
(Continued)

(58) Field of Classification Search
None
See application file for complete search history.

(56) References Cited

U.S. PATENT DOCUMENTS 2,918,701 A * 12/1959 Schrader ................. B29B 9/065
264/142
2009/0051061 A1 2/2009 Seibring et al.
(Continued)

FOREIGN PATENT DOCUMENTS

DE 102004053929 A1 5/2006
FR 2981600 A1 4/2013
(Continued)

OTHER PUBLICATIONS

International Search Report dated Oct. 6, 2015, for PCT/JP2015/070946 and English translation of the same (5 pages).

*Primary Examiner* — Monica A Huson
(74) *Attorney, Agent, or Firm* — Fitch, Even, Tabin & Flannery LLP

(57) ABSTRACT

The polyamide pellet of the present invention includes a polyamide including diamine units and dicarboxylic acid units, 50% by mole or more of the diamine units being derived from m-xylylenediamine, wherein a spherulite density of a skin portion of the pellet is 40,000 to 250,000/mm$^2$.

17 Claims, 3 Drawing Sheets

(51) Int. Cl.
*B29C 48/505* (2019.01)
*B29B 9/06* (2006.01)
*B29C 45/00* (2006.01)
*B29K 77/00* (2006.01)
*B29K 105/00* (2006.01)

(52) U.S. Cl.
CPC ............ *B29B 9/12* (2013.01); *B29C 45/0001* (2013.01); *B29C 45/47* (2013.01); *B29C 48/505* (2019.02); *C08G 69/26* (2013.01); *C08G 69/265* (2013.01); *C08G 69/30* (2013.01); *C08J 3/12* (2013.01); *B29B 9/06* (2013.01); *B29K 2077/00* (2013.01); *B29K 2105/251* (2013.01); *C08G 2120/00* (2013.01); *C08J 2377/06* (2013.01)

(56) References Cited

U.S. PATENT DOCUMENTS

| | | |
|---|---|---|
| 2009/0121372 A1 | 5/2009 | Campbell et al. |
| 2009/0239013 A1* | 9/2009 | Otaki ................. B32B 27/08 428/36.6 |
| 2010/0120961 A1 | 5/2010 | Tanaka et al. |
| 2012/0319318 A1 | 12/2012 | Wang et al. |
| 2014/0194569 A1 | 7/2014 | Mitadera et al. |
| 2014/0327171 A1 | 11/2014 | Thierry et al. |
| 2014/0349046 A1 | 11/2014 | Thieblemont |
| 2015/0108696 A1 | 4/2015 | Kouno et al. |

FOREIGN PATENT DOCUMENTS

| | | |
|---|---|---|
| JP | 2001-233958 A | 8/2001 |
| JP | 2001-270940 A | 10/2001 |
| JP | 2003-82094 A | 3/2003 |
| JP | 2003-327692 A | 11/2003 |
| JP | 2006-97013 A | 4/2006 |
| JP | 2007-31475 A | 2/2007 |
| JP | 3137439 U | 11/2007 |
| JP | 2007-321035 A | 12/2007 |
| JP | 2011-88944 A | 5/2011 |
| JP | 2012-153749 A | 8/2012 |
| WO | 2012/073969 A1 | 6/2012 |
| WO | 2013/038846 A1 | 3/2013 |
| WO | 2013/087464 A1 | 6/2013 |

* cited by examiner

POLYAMIDE PELLETS, METHOD FOR PRODUCING POLYAMIDE PELLETS, AND METHOD FOR PRODUCING POLYAMIDE MOLDED ARTICLE

CROSS-REFERENCE TO RELATED APPLICATIONS

This application is a U.S. national phase application filed under 35 U.S.C. § 371 of International Application PCT/JP2015/070946, filed Jul. 23, 2015, designating the United States, which claims priority from Japanese Application Numbers 2014-155025, 2014-155034, and 2014-155039, each filed Jul. 30, 2014, which are hereby incorporated herein by reference in their entirety.

FIELD OF THE INVENTION

The present invention relates to polyamide pellets obtained by polycondensation of a diamine and a dicarboxylic acid, a method for producing the pellets, and a method for producing polyamide molded article by using the pellets.

BACKGROUND OF THE INVENTION

A m-xylylene group-containing polyamide obtained by a polycondensation reaction between diamines including m-xylylenediamine and a dicarboxylic acid has an excellent mechanical strength and further has low permeability to oxygen, carbon dioxide gas, and gaseous substances such as odor and flavor, and therefore the polyamide has been used for a wide variety of applications such as a packaging material, a molding material, and monofilament. Among others, a polyamide obtained from m-xylylenediamine and adipic acid (hereinunder also referred to as nylon MXD6) is particularly widely used because of its high strength and high elastic modulus, as well as good gas barrier property.

m-Xylylene group-containing polyamides are widely distributed in a form of pellet in view of easy handleability. Pelletization of the m-xylylene group-containing polyamides is known to be performed, for example, by drawing out the m-xylylene group-containing polyamide after melt polycondensation into a strand form, cooling the strand with water, and then cutting the strand by a pelletizer. The polyamide pellets thus obtained are cooled relatively rapidly upon drawing out, and generally come into an amorphous state. The polyamide pellets are melt-kneaded as they are and molding-processed into various products, or when a higher molecular weight is demanded, the polyamide may be subjected to solid-phase polymerization directly in the pellet state (see, for example, PTL 1). The solid-phase polymerized polyamide pellets are generally in a crystalline state.

The polyamide pellets are demanded to have low hue from the viewpoint of making appearance and stability of molded articles good. Conventionally, for lowering the hue, for example, it is known to add a phosphorus atom-containing compound such as phosphoric acid, phosphorous acid, hypophosphorous acid, and salts thereof to the reaction system as a stabilizer in the melt polycondensation (see, for example, PTL 2).

The pelletized resin material is processed into various molded articles by extrusion molding, injection molding, and the like. When the pellets of the various resin materials are molding-processed by an extruder or an injection molder, in general, the pellets are put in a cylinder provided with a screw therein, along with other resins and additives as required, then plasticized and kneaded, and thereafter extruded or injected, to be molded into various molded articles. As the cylinder, although a twin screw type having two screws therein may also be used, a single screw type having a single screw in a cylinder has been widely used because of the simple structure.

CITATION LIST

Patent Literature

PTL 1: JP-A 2007-31475
PTL 2: JP-A 2007-321035

SUMMARY OF INVENTION

However, even when additives are added for lowering the hue as in PTL 2, coloration during the reaction cannot be sufficiently prevented in some cases. In addition, when additives are added excessively, another problem such as increased fisheyes may occur. Accordingly, it is demanded to lower the hue of the polyamide pellets by a method other than additives.

Furthermore, a m-xylylene group-containing polyamide has a relatively higher melting point, and in addition, has a nature that it rapidly softens when being heated to a certain temperature or higher. Owing to the nature, when a m-xylylene group-containing polyamide is molding-processed, a longer preheat time is required, and, for example, in a single screw extruder, kneading at a relatively higher compression ratio is demanded. However, when the pellets are rapidly compressed and kneaded at a high compression ratio by a single screw, the pellets may fuse with one another or softened pellets may wind around the screw in a compression zone, thereby causing extrusion failure. Thus, there is a problem of poor process stability.

The present invention has been made in view of the above problems, and has an object to lower hue of polyamide pellets, for example, obtained by solid-phase polymerization, thereby improving hue of molded articles obtained from the polyamide pellets.

In addition, the present invention has another object to provide polyamide pellets that are capable of being molding-processed with high process stability when a m-xylylene group-containing polyamide is kneaded by a kneading apparatus such as a cylinder provided with a single screw.

In order to solving the above problems, the present inventors first focused on a state of a surface layer portion (skin portion) of a polyamide pellet including a m-xylylene group-containing polyamide. As a result of intensive studies, the present inventors have found that, in a polyamide pellet having dense spherulites in the surface layer portion, the surface layer portion can function as if it is a protection layer to protect the polyamide pellet in a solid-phase polymerization reaction and the like, and thus can improve the hue of the polyamide pellet. The present inventors have also found that, when the cross-sectional area of a polyamide pellet including a m-xylylene group-containing polyamide is brought into a certain range while bringing a surface layer portion (skin portion) of the polyamide pellet into a specific state, the process stability is improved, completing the present invention described below. The present invention provides the following [1] to [18].

[1] A polyamide pellet including a polyamide including diamine units and dicarboxylic acid units, 50% by mole or more of the diamine units being derived from m-xylylenediamine, wherein a spherulite density of a skin portion of the pellet is 40,000 to 250,000/mm$^2$.

[2] The polyamide pellet according to the above [1], wherein a spherulite density of a core portion of the pellet is 10,000 to 40,000/mm$^2$.

[3] The polyamide pellet according to the above [1] or [2], wherein 50% by mole or more of the dicarboxylic acid units in the polyamide are derived from an aliphatic dicarboxylic acid having 6 to 12 carbon atoms.

[4] The polyamide pellet according to the above [3], wherein the aliphatic dicarboxylic acid having 6 to 12 carbon atoms is adipic acid, sebacic acid, or a mixture thereof.

[5] The polyamide pellet according to any one of the above [1] to [4], which contains a phosphorus atom-containing compound at a phosphorus atom concentration of 1 to 100 ppm.

[6] The polyamide pellet according to any one of the above [1] to [5], which satisfies a condition of the following formula (1):

$$-110 \text{ μeq/g} \leq ([COOH]-[NH_2]) \leq 110 \text{ μeq/g} \quad (1)$$

wherein in the formula (1), [COOH] represents a terminal carboxyl group concentration (μeq/g) of the polyamide and [NH$_2$] represents a terminal amino group concentration (μeq/g) of the polyamide.

[7] The polyamide pellet according to any one of the above [1] to [6], which has a relative viscosity of 2.0 to 4.2.

[8] The polyamide pellet according to any one of the above [1] to [7], wherein the spherulite density of the skin portion is 80,000 to 110,000/mm$^2$.

[9] The polyamide pellet according to any one of the above [1] to [8], which is obtained by solid-phase polymerization of a pelletized polyamide being in an amorphous state.

[10] The polyamide pellet according to the above [9], wherein the pelletized polyamide being in the amorphous state is one obtained by melt polycondensation.

[11] The polyamide pellet according to any one of the above [1] to [10], which has a cross-sectional area of 5 to 13 mm$^2$.

[12] The polyamide pellet according to the above [11], which is a polyamide pellet for high compression screw molding, which is to be kneaded and molding-processed by a single screw extruder having a compression ratio of 2.0 to 4.0.

[13] A method for producing a polyamide molded article, in which the polyamide pellets according to the above [11] or [12] are kneaded and then molding-processed to obtain the polyamide molded article, wherein the polyamide pellets are kneaded in a cylinder having a single screw therein.

[14] The method for producing a polyamide molded article according to the above [13], wherein a compression ratio in the cylinder is 2.0 to 4.0.

[15] The method for producing a polyamide molded article according to the above [13] or [14], wherein the screw includes a feeding part, a compression part following the feeding part, and a metering part following the compression part, and the feeding part, the compression part, and the metering part have lengths, with the total sum thereof converted to 1, of 0.40 to 0.55, 0.10 to 0.30, and 0.10 to 0.40, respectively.

[16] A method for producing polyamide pellets, including the steps of:

extruding a polyamide in a molten state into a strand form, the polyamide being obtained by polycondensation of a diamine containing m-xylylenediamine in 50% by mole or more and a dicarboxylic acid, cutting the polyamide extruded into the strand form while cooling with water to pelletize the polyamide, and then further cooling the pelletized polyamide with water for 4 seconds or more, and subjecting the pelletized polyamide after water cooling further to solid-phase polymerization to obtain the polyamide pellets.

[17] The method for producing polyamide pellets according to the above [16], wherein the pelletized polyamide at the end of the water cooling has a temperature of 65° C. or lower.

[18] The method for producing polyamide pellets according to the above [16] or [17], wherein the polyamide extruded into the strand form is cut to be pelletized within 2 seconds after landing on the water.

Furthermore, in order to solve the problems, the present inventors focused on a state of a surface layer portion (skin portion) and a state of a pellet interior portion (core portion), of the polyamide pellet including nylon MXD6 in an amorphous state. Thus, as a result of intensive studies, the present inventors have found that, by increasing a needle descent temperature, which is measured by a local thermal analysis, of the surface layer portion while reducing a difference between the needle descent temperature of the surface layer portion and a needle descent temperature of the core portion, presumably, a difference in thermal nature between the core portion and the pellet portion can be reduced and in addition, the surface layer portion can function as if it is a protection layer, thereby suppressing absorption of oxygen by the polyamide pellet, and that hue of molded articles and the like obtained from the pellet is accordingly improved, completing the inventions described below. Specifically, the present invention further provides the following [19] to [29].

[19] A polyamide pellet including a polyamide including diamine units and dicarboxylic acid units, 50% by mole or more of the diamine units being derived from m-xylylenediamine, and 70% by mole or more of the dicarboxylic acid units being derived from adipic acid, wherein a needle descent temperature of a skin portion of the pellet as measured by a local thermal analysis using a thermal probe is 78 to 92° C. and is higher than a needle descent temperature of a core portion of the pellet with a temperature difference being 0.1 to 2.5° C.

[20] The polyamide pellet according to the above [19], wherein when the pellets stained with a 0.1 mol/L iodine/potassium iodide solution are observed, a proportion of pellets that are stained at G≤90 (sRGB value) is 50% or less.

[21] The polyamide pellet according to the above [19] or [20], wherein the needle descent temperature of the skin portion of the pellet is 80 to 91° C.

[22] The polyamide pellet according to any one of the above [19] to [21], wherein the temperature difference between the needle descent temperature of the skin portion and the needle descent temperature of the core portion is 0.2 to 2° C.

[23] The polyamide pellet according to any one of the above [19] to [22], which contains a phosphorus atom-containing compound at a phosphorus atom concentration of 1 to 100 ppm.

[24] The polyamide pellet according to any one of the above [19] to [23], which satisfies a condition of the following formula (1):

$$-110 \text{ μeq/g} \leq ([COOH]-[NH_2]) \leq 110 \text{ μeq/g} \quad (1)$$

wherein in the formula (1), [COOH] represents a terminal carboxyl group concentration (μeq/g) of the polyamide and [NH$_2$] represents a terminal amino group concentration (μeq/g) of the polyamide.

[25] The polyamide pellet according to any one of the above [19] to [24], which has a relative viscosity of 1.8 to 2.4.
[26] The polyamide pellet according to any one of the above [19] to [25], which is molded from a polyamide obtained by melt polycondensation.
[27] A method for producing polyamide pellets, including the steps of:
    extruding a polyamide in a molten state into a strand form, the polyamide being obtained by polycondensation of a diamine containing m-xylylenediamine in 50% by mole or more and a dicarboxylic acid containing adipic acid in 70% by mole or more, and
    cutting the polyamide extruded into the strand form while cooling with water to pelletize the polyamide, and then further cooling the pelletized polyamide with water for 4 seconds or more.
[28] The method for producing polyamide pellets according to the above [27], wherein the polyamide pellets after the end of the water cooling has a temperature of 65° C. or lower.
[29] The method for producing polyamide pellets according to the above [27] or [28], wherein the polyamide extruded into the strand form is cut to be pelletized within 2 seconds after landing on the water.

In the present invention, hue of the polyamide pellets can be improved and hue of various molded articles molded from the polyamide pellets can also be improved.

Furthermore, by bringing the cross-sectional area of the polyamide pellets into a prescribed range, process failure is not likely to occur when pellets are kneaded by a kneading apparatus such as a cylinder having a single screw, providing excellent process stability.

DETAILED DESCRIPTION OF PROPOSED EMBODIMENTS

Figure 1:
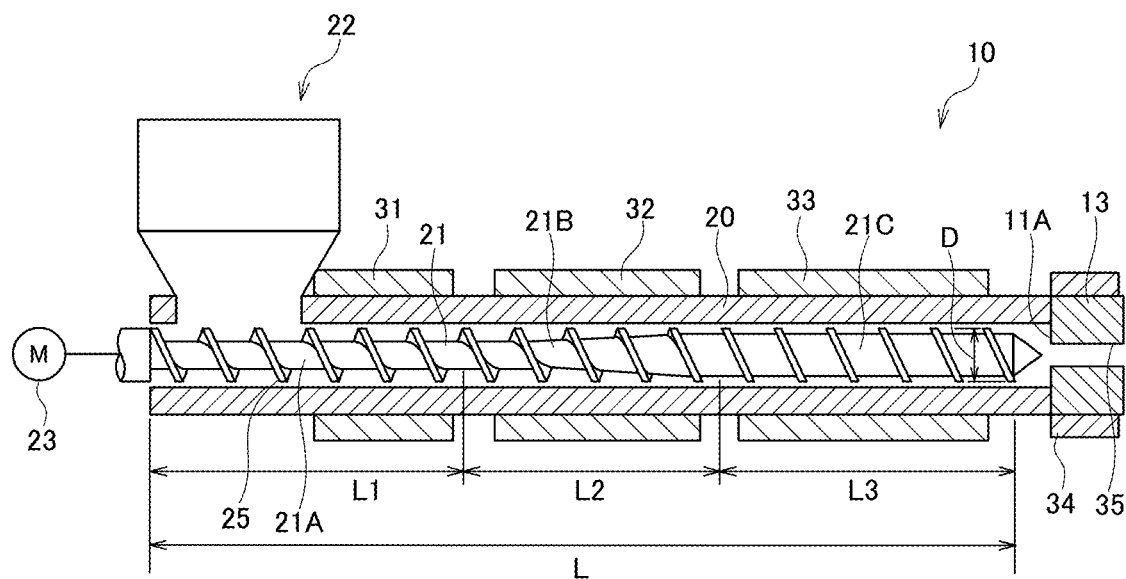
FIG. 1 is a schematic cross sectional view showing a single screw extruder used in an embodiment of the present invention.

The present invention is described below with reference to embodiments.
<First Polyamide Pellet>
A first polyamide pellet of the present invention is a polyamide pellet including a polyamide including diamine units and dicarboxylic acid units, 50% by mole or more of the diamine units being derived from m-xylylenediamine.
[Diamine Units]
In the first polyamide pellet, the diamine units in the polyamide contain constituting units derived from m-xylylenediamine in 50% by mole or more, preferably 60 to 100% by mole, more preferably 70 to 100% by mole, and further preferably 80 to 100% by mole.

In the present invention, when the constituting units derived from m-xylylenediamine are in less than 50% by mole, barrier property of a molded article obtained from the first polyamide pellets is difficult to be enhanced, and various physical properties required for the polyamide of the present invention are difficult to be obtained.

In the polyamide, examples of the diamine other than m-xylylenediamine include, but not limited to, aliphatic diamines, such as tetramethylenediamine, pentamethylenediamine, 2-methyl-1,5-pentanediamine, hexamethylenediamine, heptamethylenediamine, octamethylenediamine, nonamethylenediamine, decamethylenediamine, dodecamethylenediamine, and 2,2,4- or 2,4,4-trimethylhexamethylenediamine; alicyclic diamines, such as 1,3- or 1,4-bis(aminomethyl)cyclohexane, 1,3- or 1,4-diaminocyclohexane, bis(4-aminocyclohexyl)methane, 2,2-bis(4-aminocyclohexyl)propane, bis(aminomethyl)decalin, and bis(aminomethyl)tricyclodecane; and diamines having an aromatic ring, such as p-xylylenediamine, bis(4-aminophenyl)ether, p-phenylenediamine, and bis(aminomethyl)naphthalene.

As the diamine other than m-xylylenediamine, among these compounds, p-xylylenediamine is preferably used. When p-xylylenediamine is used, the diamine units in the polyamide contain constituting units derived from p-xylylenediamine in 50% by mole or less, preferably 40% by mole or less, and further preferably 30% by mole or less.
[Dicarboxylic Acid Units]
In the first polyamide pellet, from the viewpoint of the crystallinity, the dicarboxylic acid units in the polyamide contain aliphatic dicarboxylic acid units in preferably 50% by mole or more, more preferably 70% by mole or more, and further preferably 90% by mole or more. Specific examples of the aliphatic dicarboxylic acid include α,ω-linear aliphatic dicarboxylic acids having 4 to 20 carbon atoms, such as succinic acid, glutaric acid, adipic acid, pimelic acid, suberic acid, azelaic acid, sebacic acid, 1,9-nonanedicarboxylic acid, and 1,10-decanedicarboxylic acid.

The aliphatic dicarboxylic acid is more preferably one having 6 to 12 carbon atoms, further preferably one having 6 to 10 carbon atoms, and particularly preferably adipic acid, sebacic acid, or a mixture thereof. In the present invention, by using adipic acid, gas barrier property of molded articles can be improved. By using sebacic acid, molded articles having low water absorbance and excellent dimension stability are liable to be obtained.

Examples of a compound that can constitute dicarboxylic acid units other than the aliphatic dicarboxylic acid units include, but not limited thereto, alicyclic dicarboxylic acids, such as 1,3-cyclohexanedicarboxylic acid and 1,4-cyclohexanedicarboxylic acid; and aromatic dicarboxylic acids, such as terephthalic acid, isophthalic acid, orthophthalic acid, xylylenedicarboxylic acid, and naphthalenedicarboxylic acid. Among these compounds, isophthalic acid is preferred since it does not inhibit the polycondensation reaction upon producing the polyamide and a polyamide excellent in barrier property can be easily obtained.

In the present invention, as the polyamide, a polyamide in which all the diamine units consist of constituting units derived from m-xylylenediamine and all the dicarboxylic acid units consist of aliphatic dicarboxylic acid units is most preferred.
[Spherulite Density]
The first polyamide pellet of the present invention is in a crystalline state. A large number of fine spherulites exist in a skin portion forming the pellet surface and the spherulites exist densely. However, the spherulites mentioned in the present invention are not spherulites recognized by a conventional observation method such as a polarization microscope, but refer to a pattern due to spherulites which is recognized by observation of the skin portion after ion milling through irradiation with an ion beam as described later. The spherulite density of the skin portion is 40,000 to 250,000/mm$^2$ as measured by a measurement method described later. Thus, in the first polyamide pellet, since the pellet has such a structure that the spherulites of the skin portion of the pellet exist densely, the polyamide pellet is protected in the skin portion and deterioration of hue due to thermal history is prevented, making it possible to improve the hue of the pellet. In addition, the crystallinity of the surface is increased and even if plasticized, pellets are less liable to fuse with one another. For this reason, even when the pellets are kneaded while being compressed with a high compression force by a single screw extruder or the like, the pellets do not fuse with one another, making it possible to enhance the process stability.

On the other hand, when the spherulite density is less than the above-mentioned lower limit, or the pattern due to spherulites cannot be sufficiently observed after ion milling, spherulites do not exist densely in the skin portion, or spherulites do not exist clearly in the skin portion. For this reason, the polyamide pellet is not sufficiently protected in the skin portion, and the hue of the pellet is difficult to be improved.

Furthermore, when the spherulite density is smaller than the above-mentioned lower limit, or the pattern due to spherulites is not sufficiently observed after ion milling, the crystallinity of the surface is lowered. For this reason, when the pellets are kneaded while being plasticized by a single screw extruder or the like, failures such as fusing of pellets is likely to occur.

When the spherulite density is larger than the above-mentioned upper limit, production by the production method described later may be difficult.

In the skin portion of the first polyamide pellet, the spherulite density is preferably 80,000 to 110,000/mm$^2$. When the spherulite density is in such a range, the polyamide pellet is protected well in the skin portion, whereby the hue thereof can be improved and hue of molded articles obtained from the first polyamide pellets can also be improved. In addition, when the spherulite density is in such a range, the first polyamide pellets are less liable to fuse with one another, whereby the process stability can be further enhanced.

In the first polyamide pellet, generally, a large number of spherulites exist also in a core portion forming the interior portion of the pellet, for example, when observed after ion milling, a large number of spherulites can be clearly recognized. However, in the core portion, spherulites exist relatively coarsely, and generally, the spherulite density of a core portion of the first polyamide pellet is smaller than the spherulite density of the skin portion. Specifically, the spherulite density of the core portion is preferably 10,000 to 40,000/mm$^2$, and more preferably 15,000 to 40,000/mm$^2$. When the spherulite density of the core portion is in the above range, the difference in thermal nature from the skin portion is lowered and physical properties and the like of molded articles are easy to be stabilized.

Incidentally, in the first polyamide pellet, the skin portion refers to a portion to 60 μm from the circumference of the pellet in a cross section perpendicular to the axis direction of the pellet, and the core portion refers to a portion within 70% of the pellet radius from the pellet center. The pellet diameter means the largest diameter in the above cross section of the pellet, and the pellet radius means the ½ length of the pellet diameter.

There are some measures for polymerization degree of the polyamide, relative viscosity is generally used. The first polyamide pellet preferably has a relative viscosity of 2.0 to 4.2. A polyamide having a relative viscosity within the above range can be easily produced by the production method described later. In addition, molded articles molded from the first polyamide pellets have high mechanical strength and moldability. From the above viewpoints, the relative viscosity is more preferably 2.0 to 3.6.

The first polyamide pellet preferably satisfies a condition of the following formula (1):

$$-110 \text{ μeq/g} \leq ([\text{COOH}]-[\text{NH}_2]) \leq 110 \text{ μeq/g} \quad (1)$$

wherein in the formula (1), [COOH] represents a terminal carboxyl group concentration (μeq/g) of the polyamide and [NH$_2$] represents a terminal amino group concentration (μeq/g) of the polyamide.

As the above, when the difference between the terminal carboxyl group concentration and the terminal amino group concentration is small, heat resistance is good and color deterioration is less liable to occur. In addition, in order to further suppress the color deterioration, ([COOH]—[NH$_2$]) is more preferably −80 to 80 μeq/g.

The first polyamide pellet has only one melting point peak. The melting point of the first polyamide pellet is not particularly limited, but preferably 190 to 290° C., and more preferably 210 to 270° C.

The first polyamide pellet generally has a length along the strand direction (axis direction) of, but is not particularly limited to, approximately from 1.0 to 5.0 mm, preferably approximately from 1.0 to 4.0 mm, more preferably from 2.0 to 4.0 mm, and further preferably from 2.0 to 3.5 mm. The pellet diameter of the first polyamide pellet is generally approximately from 1.0 to 4.0 mm, and preferably from 2.0 to 3.5 mm. The shape of the pellet is not particularly limited, but generally, a shape obtained by cutting across the strand as described later and preferably a cylinder shape or an elliptic cylinder shape.

<Production Method of First Polyamide Pellet>

Next, the method for producing the first polyamide pellet in the present invention is described.

The method for producing the first polyamide pellet in the present invention is not particularly limited as long as it is a method by which the first polyamide pellet as described above can be obtained, but preferably the first polyamide pellet is obtained by subjecting a pelletized polyamide further to solid-phase polymerization. In addition, the pelletized polyamide is preferably a pellet obtained, for example, by melt polycondensation of a diamine and a dicarboxylic acid. An example of the method for producing the polyamide pellet of the present invention by melt polycondensation and solid-phase polymerization as above is described below.

A method for producing the first polyamide pellet in one embodiment of the present invention includes the steps of: extruding a polyamide in a molten state into a strand form, the polyamide being obtained by polycondensation of a diamine and a dicarboxylic acid; cutting the polyamide extruded into the strand form while cooling with water to pelletize the polyamide; then further cooling the pelletized polyamide with water for 4 seconds or more; and subjecting the pelletized polyamide after water cooling further to solid-phase polymerization to obtain polyamide pellets.

In production of a m-xylylene group-containing polyamide, conventionally, the time for water cooling is generally reduced as much as possible in view of the not-so-high temperature after the melt polycondensation and the constraint in the apparatus. A technique in which a polyamide obtained by polycondensation is extruded into a strand form and the strand is cooled as it is with water is known.

In contrast, in this production method, since a polyamide is cooled with water in a state where the polyamide is fragmented into a pellet form and the time for water cooling is prolonged to 4 seconds or more as mentioned above, the temperature of the pellet surface is rapidly lowered, whereby the morphology of the skin portion is made specific. For this reason, when the pelletized polyamide obtained by pelletization followed by water cooling according to the above method is crystallized by solid-phase polymerization, spherulites are clearly formed in the skin portion as described above, and the spherulite density is also increased.

Nevertheless, the core portion of the pellet is cooled rapidly although the cooling rate is slightly lower as compared to the skin portion, and the morphology of the core portion is presumed to be specific although it is a little different from that of the skin portion. For this reason, when the polyamide pelletized according to the above method is crystallized by solid-phase polymerization, spherulites are clearly formed in the core portion and the spherulite density can be made relatively higher as described above.

This production method is described in more detail below.

In this production method, the polycondensation of a diamine and a dicarboxylic acid is preferably performed by a melt polycondensation method.

As a suitable example of the melt polycondensation method, a so-called direct polymerization method in which a diamine is added directly to a molten dicarboxylic acid for polycondensation is exemplified. More specifically, while stirring the dicarboxylic acid in a molten state in a reaction chamber, the diamine is added continuously or intermittently to perform polycondensation while removing the condensed water, and at the same time, the reaction temperature is increased during the diamine is added so as not to be fall below the melting point of the produced polyamide. Also after the end of the addition of the diamine, the reaction may be continued while controlling the temperature so as not to fall below the melting point of the produced polyamide. The above reaction may be conducted under either condition of a normal pressure or an increased pressure. After that, the reaction may be further continued for a certain time after the pressure is gradually reduced to a pressure less than the normal pressure. Incidentally, the upper limit of the reaction temperature in this production method is generally controlled to a temperature of (the melting point of the obtained polyamide in an amorphous state+ about 70° C.) or lower, and preferably to a temperature of (the melting point of the obtained polyamide in the amorphous state+ about 20° C.) or lower.

The diamine and the dicarboxylic acid used in this production method may be any diamines and dicarboxylic acids from which the polyamide as described above can be obtained, and, for example, the content (% by mole) of each kind of diamine (m-xylylenediamine and the like) in the total diamines used is the same as the proportion (% by mole) of each kind of constituting units derived from the each diamine in the diamine units in the above polyamide. The same is true for the dicarboxylic acids.

The melt polycondensation method is not limited to the direct polymerization method, and the melt polycondensation may be performed according to a nylon salt method in which a nylon salt including a dicarboxylic acid and a diamine is heated in the presence of water under an increased pressure.

Furthermore, the polycondensation reaction may be conducted according to a reaction extrusion method in which an oligomer of a polyamide including a diamine and a dicarboxylic acid is melt-kneaded in an extruder to react the oligomer. In the reaction extrusion method, for a sufficient reaction, a screw suitable for reaction extrusion is used, and a twin screw extruder having a relatively large L/D is preferably used.

The polyamide in a molten state obtained by the polycondensation is drawn out in a strand form, for example, from a strand die provided on a bottom portion of a reaction chamber. Incidentally, when the polyamide is drawn out, the inside of the reaction chamber is generally pressurized by nitrogen or the like. Here, the die diameter of the strand die is set depending on the pellet diameter and the cross-sectional area of the obtained pellet. The temperature of the polyamide when the strand is drawn out may be any temperature higher than the melting point of the polyamide so that the polyamide is kept in a molten state, but is preferably a temperature of the melting point to (the melting point+70° C.), and more preferably a temperature of the melting point to (the melting point+20° C.).

The polyamide in a molten state drawn in a strand form is pelletized while being cooled with water. More specifically, the polyamide drawn in a strand form is cut across the strand by a cutter in a pelletizer while being received at a prescribed receiving rate in a state of being dipped in a water bath and being cooled in water. Here, the cutter receiving rate in the pelletizer is not particularly limited, but, for example, 100 to 300 m/min, and preferably 120 to 280 m/min.

The polyamide in the molten state drawn in a strand form is preferably cut immediately after landing on the water, and specifically, the polyamide is cut to be pelletized preferably within 2 seconds after landing on the water, and more preferably within 1 second after landing on the water. When the polyamide is cut to be pelletized immediately after landing on the water, the polyamide is cooled immediately in a fragmented state and therefore is likely to be cooled quickly.

As described above, the pelletized polyamide is continuously cooled with water while being fed in a water tank, and then leaves the water and is taken out of the water tank. Here, the time from pelletization to leaving water (hereinafter also referred to as "pellet water cooling time") is 4 seconds or more, but preferably 5 seconds or more. When the pellet water cooling time is less than 4 seconds, the polyamide is not sufficiently cooled and the spherulite density of the skin portion possibly cannot be increased.

The upper limit of the pellet water cooling time is not particularly limited, but from the viewpoint of efficiently producing the polyamide pellets, is generally 30 seconds or less, and preferably 10 seconds or less.

The temperature of the pelletized polyamide at the end of the water cooling (that is, when the polyamide leaves the water) is preferably 65° C. or lower, more preferably 60° C. or lower, and further preferably 50° C. or lower. the lower limit of the temperature of the polyamide at the end of the water cooling is not particularly limited, but for making the steps efficient, is preferably 20° C. or higher, more preferably 30° C. or higher, and further preferably 35° C. or higher.

The pelletized polyamide taken out of the water tank may be dried naturally or the water on the pellet surface may be forcedly removed by blowing air from a drier.

The temperature of the water tank is, for example, 0 to 50° C., preferably 10 to 40° C., and more preferably 15 to 30° C.

The pelletized polyamide obtained through the aforementioned steps (hereinafter, for convenience, also referred to as "polycondensate polyamide pellet" is generally in an amorphous state and comes into a crystalline state by being subjected to solid-phase polymerization described later. Incidentally, the polyamide in an amorphous state, as used herein, refers to one having a crystallinity of less than 25%, and the polyamide in a crystalline state refers to one having a crystallinity of 25% or more. The crystallinity is measured according to a measurement method in Examples described later.

Incidentally, in this production method, for example, by adjusting one or more of the receiving rate in the pelletizer, the die diameter of the strand die, the die valve opening, and the pressure in the reaction chamber when the polyamide is drawn out of the reaction chamber, the cross-sectional area of the pellet and the pellet diameter can be appropriately adjusted.

In the polycondensation reaction, the dicarboxylic acid component and the diamine component may be subjected to polycondensation under the presence of a phosphorus atom-containing compound. By the phosphorus atom-containing compound existing in this manner, polymerizability of the polyamide can be improved and coloration of the polyamide can be prevented.

Examples of the phosphorus atom-containing compound include phosphinic acid compounds, such as dimethylphosphinic acid and phenylmethylphosphinic acid; hypophosphorous acid compounds, such as hypophosphorous acid, sodium hypophosphite, potassium hypophosphite, lithium hypophosphite, magnesium hypophosphite, calcium hypophosphite, and ethyl hypophosphite; phosphonic acid compounds, such as phosphonic acid, sodium phosphonate, potassium phosphonate, lithium phosphonate, potassium phosphonate, magnesium phosphonate, calcium phosphonate, phenylphosphonic acid, ethylphosphonic acid, sodium phenylphosphonate, potassium phenylphosphonate, lithium phenylphosphonate, diethyl phenylphosphonate, sodium ethylphosphonate, and potassium ethylphosphonate; phosphonous acid compounds, such as phosphonous acid, sodium phosphinate, lithium phosphinate, potassium phosphinate, magnesium phosphinate, calcium phosphinate, phenylphosphonous acid, sodium phenylphosphinate, potassium phenylphosphinate, lithium phenylphosphinate, and ethyl phenylphosphinate; phosphorous acid compounds, such as phosphorous acid, sodium hydrogenphosphite, sodium phosphite, lithium phosphite, potassium phosphite, magnesium phosphite, calcium phosphite, triethyl phosphite, triphenyl phosphite, and pyrophosphorous acid.

Among these compounds, preferred for use herein are metal hypophosphites such as sodium hypophosphite, calcium hypophosphite, potassium hypophosphite, and lithium hypophosphite, since their effects of promoting the polycondensation reaction and preventing coloration are excellent. Sodium hypophosphite is particularly preferred. Incidentally, the phosphorus atom-containing compounds usable in the present invention are not limited to the above compounds.

The phosphorus atom-containing compound is incorporated preferably so as to be 1 to 350 ppm in terms of the concentration of phosphorus atoms contained in the polyamide pellets obtained, more preferably 1 to 200 ppm, further preferably 1 to 100 ppm, furthermore preferably 1 to 80 ppm, and the most preferably 2 to 80 ppm. When the concentration is 1 ppm or more, the polycondensation reaction proceeds at an appropriate rate, and coloration is not likely to occur in the polycondensation reaction. When the concentration is 350 ppm or less, the obtained polyamide is not likely to gel and mixing in molded articles of fisheyes which are considered to be attributed to a phosphorus atom-containing compound can be reduced so that the appearance of the molded articles is improved. Furthermore, in the present invention, the polyamide pellet obtained is not likely to be colored, and even when the amount incorporated is as small as 100 ppm or 80 ppm or less, the hue of the polyamide pellet is not likely to deteriorate.

The polycondensation reaction may be conducted in the presence of an alkali metal compound in addition to the phosphorus atom-containing compound. By incorporating the alkali metal compound, reaction rate of amidation reaction is regulated and gelling possibly occurring by addition of the phosphorus atom-containing compound can be prevented.

The alkali metal compound and the foregoing phosphorus atom-containing compound are generally added to the reaction system before the dicarboxylic acid component and the diamine component react with each other.

As the alkali metal compound, preferred are an alkali metal hydroxide, an alkali metal acetate, an alkali metal carbonate, an alkali metal alkoxide, etc. Specific examples of the alkali metal compound usable in the present invention include lithium hydroxide, sodium hydroxide, potassium hydroxide, rubidium hydroxide, cesium hydroxide, lithium acetate, sodium acetate, potassium acetate, rubidium acetate, cesium acetate, sodium methoxide, sodium ethoxide, sodium propoxide, sodium butoxide, potassium methoxide, lithium methoxide, and sodium carbonate, but any others not limited thereto are usable herein. The ratio (molar ratio) of the phosphorus atom-containing compound to the alkali metal compound in the polyamide pellet obtained, i.e., phosphorus atom-containing compound/alkali metal compound is preferably within a range of 1.0/0.05 to 1.0/1.5 from the viewpoint of controlling the polymerization speed and reducing the yellow index, more preferably from 1.0/0.1 to 1.0/1.2, and furthermore preferably from 1.0/0.2 to 1.0/1.1.

In addition, in the reaction system, besides the diamine, the dicarboxylic acid, the phosphorus atom-containing compound, and the alkali metal compound, other additives such as a molecular weight regulator and other monomers described later may be further added.

As described above, the method for subjecting the pelletized polyamide (polycondensate polyamide pellet) to solid-phase polymerization is not particularly limited as long as it is a method where the polyamide is crystallized and the molecular weight (relative viscosity) is increased. The solid-phase polymerization is conducted by using, for example, continuous heat drying apparatuses, rotary drum-type heating apparatuses called tumble dryer, conical dryer, rotary dryer, etc. and a conical heating apparatus provided with rotor blade therein called Nauta mixer, but any known methods and apparatuses not limited thereto may be used. Among these apparatuses, rotary drum-type heating apparatuses are preferably used since the inside of the system is hermetically closed and polycondensation is easy to proceed in a state where oxygen which causes coloration is eliminated.

In addition, the condition of the solid-phase polymerization is not limited as long as the polymerization is conducted under a condition lower than the melting point of the first polyamide pellet obtained, but it is preferred that, for example, the temperature of the reaction system is gradually elevated, and the reaction is conducted under a temperature of 130° C. or higher and lower than the melting point of the first polyamide pellet for approximately from 1 to 10 hours, preferably approximately from 1.5 to 6 hours. In the solid-phase polymerization, the reaction system is preferably made under a reduced pressure, preferably 20 kPa or lower, and more preferably 10 kPa or lower or so.

As described above, in the present invention, since the spherulite density of the skin portion is made larger, the hue of the first polyamide pellet obtained can be improved. When the first polyamide pellet is used as a raw material and molding-processed, the hue of the molded article can be improved.

<Polyamide Molded Article>

The first polyamide pellet of the present invention can be molded into a polyamide molded article having a desired shape by a known molding method after being mixed with any other components, as required. Examples of the molding method include injection molding, blow molding, extrusion molding, compression molding, extension, vacuum molding, and the like. The polyamide molded article is not particularly limited, and examples thereof include various molded articles such as film, sheet, tube, hose, pipe, a hollow container, a bottle, a preform of hollow container or bottle, fiber, and components having various shapes.

The polyamide molded article of the present invention may be produced through lamination or adhesion on a molded article formed from another resin material, thereby forming a molded article such as a multilayer structure, a composite fiber, or other components. Examples of the multilayer structure include multilayer film, multilayer sheet, multilayer tube, multilayer hose, multilayer pipe, a multilayer container, a multilayer bottle, or a preform of a multilayer container or a multilayer bottle.

In the present invention, when the first polyamide pellet mentioned above is molded by a prescribed molding apparatus such as a single screw extruder, the cross-sectional area thereof is made 5 to 13 mm². With the cross-sectional area of the first polyamide pellet of less than 5 mm², when the pellets are kneaded, for example, in a single screw extruder, failures such as the pellets winding around the screw may occur, and even when the spherulite density of the skin portion is increased as described above, the process stability cannot be improved. On the other hand, when the cross-sectional area is larger than 13 mm², the load on a kneading apparatus for kneading the pellets is increased and, for example, in a single screw extruder, vibration due to the load may be generated to deteriorate the process stability. From the viewpoints, the cross-sectional area of the polyamide pellets is preferably 6 to 12 mm², and more preferably 6 to 10 mm².

Incidentally, the cross-sectional area of a pellet is determined by measuring a diameter (the short diameter and the long diameter in the case of a shape other than a circle) in a cross section perpendicular to the strand direction (axis direction), for example, with a caliper to calculate the area with the pellet cross section considered as a circular or elliptic shape. Incidentally, the long diameter means the longest diameter in the above cross section of the pellet and the short diameter means the length of the diameter perpendicular to the long diameter in the cross section.

When molding is performed by a prescribed molding apparatus such as a single screw extruder, the first polyamide pellets have the cross-sectional area described above, and the length along the strand direction (axis direction) therein (pellet length) is preferably 1.5 to 5.0 mm. With the pellet length of 1.5 mm or more, when the first polyamide pellets are kneaded, winding of the pellets around the screw and the like is easy to be prevented. In addition, with the pellet length of 5.0 mm or less, the load exerted on the extruder is easy to be reduced. From the viewpoints, the length of the pellets is more preferably 2.0 to 4.0 mm.

The first polyamide pellet having the specific pellet size as mentioned above is preferably used as a polyamide pellet for high compression screw molding which is kneaded and molding-processed by a single screw extruder having a high compression screw. Since the first polyamide pellet has a certain pellet size and a large number of fine spherulites exist in the skin portion, failures such as fusion of the pellets upon kneading and winding of the pellets around the screw can be prevented and further, the load on the single screw extruder may be reduced. Accordingly, even when the pellets are kneaded by a single screw extruder having a high compression screw, it is possible to make the processability good.

As the single screw extruder having a high compression screw, one having a compression ratio (C/R) in the cylinder is 2.0 to 4.0 may be mentioned, and the single screw extruder described later is exemplified as a typical specific example.

[Production Method of Polyamide Molded Article]

As a method for producing a polyamide molded article using the first polyamide pellet, a method in which the polyamide pellets having a specific pellet size (a specific cross-sectional area, etc.) are kneaded and then molding-processed to obtain the polyamide molded article is mentioned. In this method, it is preferred that the first polyamide pellets are kneaded by a cylinder having a single screw therein. In the present invention, as described above, when the spherulite density of the skin portion is within the certain range and the cross-sectional area of the pellets is also within the certain range, even in kneading by a single screw, excellent process stability can be achieved.

Hereinunder, an embodiment of this production method for forming a polyamide molded article by an extruder is described with reference to FIG. 1. FIG. 1 is a schematic view showing an extruder used in the embodiment.

As shown in FIG. 1, an extruder 10 is a single screw extruder, and is provided with a cylinder 20, a single screw 21 and a die (not shown) provided inside the cylinder 20, and an adapter 13 for attaching the die onto the tip end of the cylinder 20. The adapter 13 is a communication part for feeding a raw material from the cylinder 20 to the die. The extruder 10 is further provided with a hopper 22 attached to the upstream side end of the cylinder 20, and a screw driver 23 for rotating the screw 21.

The screw 21 has a threaded portion 25 formed in a spiral form on a side surface of a screw shaft. The outer diameter D of the threaded portion 25 is slightly smaller than the inner diameter of the inner peripheral surface of the cylinder, and set to a constant size.

The screw 21 has a feeding part 21A, a compression part 21B following the feeding part 21A, and a metering part 21C following the compression part 21B, from the proximal end toward the tip end. The feeding part 21A refers to a zone provided with the threaded portion 25 of the screw and starting from the thread-starting position, where the groove depth (also referred to as height or screw depth) is constant. The compression part 21B refers to a zone where the groove depth is gradually decreased. The metering part 21C refers to a zone on the tip end of the screw where the groove depth is smaller and constant.

The lengths L1, L2 and L3 of the feeding part, the compression part and the metering part are generally, with the total sum thereof converted to 1, approximately from 0.30 to 0.55, from 0.10 to 0.35, and from 0.10 to 0.40, respectively. It is preferred that the length L1 of the feeding part is from 0.40 to 0.55, the length L2 of the compression part is from 0.10 to 0.30, and the length L3 of the metering part is from 0.10 to 0.40, and more preferably, the length L1 of the feeding part is from 0.45 to 0.55, the length L2 of the compression part is from 0.10 to 0.20, and the length L3 of the metering part is from 0.20 to 0.40. When the feeding part is thus relatively longer, it is possible to apply preheat on the polyamide pellets for a relatively longer time prior to the compression. For this reason, even with a m-xylene group-containing polyamide whose melting point is relatively higher, the polyamide pellets can be easily plasticized.

The single screw extruder is preferably of a so-called high compression screw type, and the compression ratio (C/R) is preferably relatively higher. Specifically, the compression ratio (C/R) in the cylinder 20 is preferably 2.0 to 4.0, and more preferably 2.3 to 3.5. Incidentally, the compression ratio (C/R) is expressed by a ratio of the resin volume for 1 pitch of the feeding part 21A to the resin volume for 1 pitch in the metering part 21C. When the compression ratio of the screw is within the above range, the polyamide pellets are sheared under high compression, and the plasticizing and kneading of the pellets are facilitated. In addition, even in plasticizing under such high compression, since the spherulite density of the skin portion of the polyamide pellets is higher as described above, the failure of fusion of the pellets is less likely to occur.

The ratio (=L/D) of the screw effective length L to the screw diameter D of the present invention is preferably 20 to 35, and more preferably 23 to 30. When the ratio (L/D) is 20 or more, the polyamide pellets can be sufficiently plasticized, and further molten and kneaded. When the ratio is 35 or less, the motor capacity for driving the screw can be suppressed to the extent that causes no economic problem.

Incidentally, the screw effective length L refers to a length of the threaded portion (from the thread-starting position to the thread-finishing end) of the screw, and is equal to the total sum of the lengths L1, L2 and L3.

The screw diameter D is not particularly limited as long as the polyamide pellets of the present invention can be kneaded, and generally approximately from 20 to 120 mm, but a screw having a diameter of approximately from 20 to 90 mm is preferably used.

The shape of the screw is not particularly limited, but from the viewpoint of rate of the extrusion, a full-flight screw is preferred and a single flight type or a double flight type may be applicable.

In the cylinder 20, for example, heaters 31, 32 and 33 are sequentially provided from the proximal end of the screw 21 toward the tip end of the screw. The heaters 31, 32 and 33 respectively heat parts of the cylinder corresponding to the feeding part 21A, the compression part 21B, and the metering part 21C of the screw, respectively, and control the temperatures (the cylinder temperatures). Incidentally, the heaters 31, 32 and 33 may respectively heat the entire cylinder parts respectively corresponding to the feeding part 21A, the compression part 21B, and the metering part 21C to prescribed temperatures, but preferably the heaters respectively heat major portions (for example, parts of 80% or more) of the cylinder parts respectively corresponding to the feeding part 21A, the compression part 21B, and the metering part 21C to prescribed temperatures. In addition, it is preferred that a heater 34 is provided so as to surround the adapter 13 and that the adapter 13 (the communication part) is heated to a prescribed temperature by the heater 34. It is further preferred that a heater is provided on the die not shown and the die is heated to a prescribed temperature by the heater. Incidentally, hereinunder, the respective temperatures of the parts of the screw 21 respectively heated by the heaters 31, 32 and 33 are designated as temperatures C1, C2 and C3, respectively. The temperature of the adapter heated by the heater 34 provided on the adapter 13 is designated as a temperature H, and the die temperature heated by the heater provided on the die is designated as a temperature D.

In the cylinder 20, it is preferred that the part corresponding to the feeding part 21A (that is, the temperature C1) is heated to, but not particularly limited to, a temperature lower than the melting point of the polyamide pellet and (the melting point of the polyamide pellet−40° C.) or higher by the heater 31. In addition, the temperatures on the downstream side of the feeding part 21A (specifically, the temperatures C2 and C3 of the cylinder, the temperature H of the communication part, and the temperature D of the die) are preferably controlled to temperatures of the melting point of the polyamide pellet or higher, and more preferably controlled to temperatures of from the melting point of the polyamide pellet to (the melting point of the polyamide pellet+40° C.). Setting the temperatures as described above makes it possible to sufficiently preheat the pellets in the feeding part 21A and to melt the pellets in the compression part 21B and the metering part 21C, and to stably extrude the molten polyamide from the die, while suppressing the thermal history on the polyamide pellets.

The extruder 10 plasticizes a feed material put on the proximal end side of the screw 21 from the hopper 22, while moving the feed material by the screw 21, further kneads the material while melting it, and discharges the kneaded material from an outlet 11A provided on the cylinder tip end. The feed material may include the above-mentioned polyamide pellets alone, or may include other resin materials, additives, etc. blended in the polyamide pellets. The other resin materials may be put in a form of pellet, or in another form such as a powder form. The additives may be incorporated in pellets of the other resin material in advance, or may be put from the hopper 22 in a powder or other forms.

The feed material discharged from the outlet 11A of the screw 21 is introduced to the die via an introduction path 35 in the adapter 13, and extruded from the die to be molded into a molded article having a prescribed shape.

The die used may be a known die, and appropriately selected depending on the shape of the molded article. Specific examples of the die include a straight die, a crosshead die, a T-die, etc.

When the polyamide pellet forms a multilayer structure and the like together with other resin materials, the extruder may be provided with, in addition to the cylinder for kneading the polyamide pellets, cylinders for kneading the other resin materials. The plural cylinders are connected to a die (for example, multilayer die) provided with plural flowing paths for forming the multilayer structure, and in the die, the multilayer structure is formed from the polyamide and other resin materials fed from the cylinders.

The method for producing the polyamide molded article is not limited to the above method, and, for example, an injection molding apparatus provided with a cylinder having a single screw may be used. In this case, a cavity, instead of a die, is attached to the tip end of the cylinder via a communication part (for example, a nozzle). In the injection molding apparatus, raw materials kneaded in the cylinder are fed to the cavity via the communication part, and processed into a polyamide molded article having a desired shape in the cavity. Other configurations are the same as in the case of production in the extruder, and therefore the explanation is omitted.

The polyamide molded article obtained by the injection molding can also be various molded articles as described above, and, for example, may constitute a multilayer structure together with other resin materials. Typical examples of the multilayer structure molded by the injection molding include a multilayer container or a multilayer bottle in which a polyamide layer molded from the polyamide pellet and a polyester layer molded from a polyester resin such as polyethylene terephthalate are laminated, and a preform thereof, such as, for example, a container or a bottle of a 3-layer structure of polyester layer/polyamide layer/polyester layer, from the inner side thereof, or a preform thereof; and a container or a bottle of 5-layer structure of polyester layer/polyamide layer/polyester layer/polyamide layer/polyester layer, from the inner side thereof, or a preform thereof. Incidentally, when a multilayer structure is formed by injection molding, plural cylinders are generally connected to the cavity.

As described above, in the present invention, since the cross-sectional area of the first polyamide pellet is made a certain value while increasing the spherulite density of the skin portion, even when being plasticized and kneaded, for example, by a cylinder having a single screw under a high compression force, pellets are prevented from fussing and winding around the screw. For this reason, regardless the kind of the molding apparatus, it is possible to form a molded article with high process stability.

<Second Polyamide Pellets>

While the first polyamide pellet described above is a polyamide pellet in which a certain crystalline state is seen in the skin portion, a second polyamide pellet described below is characterized by a needle descent temperature in the skin portion and the core portion. Incidentally, as described later, the second polyamide pellet is generally in an amorphous state, and by subjecting the second polyamide pellet to solid-phase polymerization, the first polyamide pellet can be obtained, but the method for producing the first polyamide pellet is not limited thereto.

The second polyamide pellet is described in detail below.

The second polyamide pellet includes a polyamide including diamine units and dicarboxylic acid units, 50% by mole or more of the diamine units being derived from m-xylylenediamine and 70% by mole or more of the dicarboxylic acid units being derived from adipic acid.

The second polyamide pellet is generally in an amorphous state. The polyamide in an amorphous state is crystallized, for example, by solid-phase polymerization, and the crystallinity generally becomes higher than 25% by solid-phase polymerization.

[Diamine Units]

In the second polyamide pellet, the diamine units in the polyamide contain constituting units derived from m-xylylenediamine in 50% by mole or more, preferably 70 to 100% by mole, more preferably 80 to 100% by mole, and further preferably 90 to 100% by mole. In the second polyamide pellet, when the constituting units derived from m-xylylenediamine are in lower than 50% by mole, barrier property of a molded article obtained from the polyamide pellet is difficult to be enhanced, and desired levels of various physical properties such as strength and elastic modulus are difficult to be obtained.

In the polyamide, examples of a diamine other than m-xylylenediamine include, but not limited to, aliphatic diamines, such as tetramethylenediamine, pentamethylenediamine, 2-methyl-1,5-pentanediamine, hexamethylenediamine, heptamethylenediamine, octamethylenediamine, nonamethylenediamine, decamethylenediamine, dodecamethylenediamine, and 2,2,4- or 2,4,4-trimethylhexamethylenediamine; alicyclic diamines such as 1,3- or 1,4-bis(aminomethyl)cyclohexane, 1,3- or 1,4-diaminocyclohexane, bis(4-aminocyclohexyl)methane, 2,2-bis(4-aminocyclohexyl)propane, bis(aminomethyl)decalin, and bis(aminomethyl)tricyclodecane; and diamines having an aromatic ring, such as p-xylylenediamine, bis(4-aminophenyl)ether, p-phenylenediamine, and bis(aminomethyl)naphthalene.

Among these compounds, p-xylylenediamine is preferably used as a diamine other than m-xylylenediamine. When p-xylylenediamine is used, the diamine units in the polyamide contain constituting units derived from p-xylylenediamine in 50% by mole or less, preferably 35% by mole or less, and further preferably 10% by mole or less.

[Dicarboxylic Acid Units]

The dicarboxylic acid units in the polyamide in the second polyamide pellet contain constituting units derived from adipic acid in 70% by mole or more, preferably 75 to 100% by mole, and more preferably 90 to 100% by mole. When the proportion of the constituting units derived from adipic acid is less than 70% by mole, the barrier property of the polyamide is difficult to be enhanced, and desired levels of various physical properties such as strength and elastic modulus are difficult to be obtained.

The dicarboxylic acid units in the polyamide may consist of constituting units derived from adipic acid, or may contain constituting units derived from dicarboxylic acids other than adipic acid.

In the polyamide, examples of the dicarboxylic acid other than adipic acid include, but not limited to, α,ω-linear aliphatic dicarboxylic acids having 4 to 20 carbon atom, such as succinic acid, glutaric acid, pimelic acid, suberic acid, azelaic acid, sebacic acid, 1,9-nonanedicarboxylic acid, and 1,10-decanedicarboxylic acid; alicyclic dicarboxylic acids, such as 1,3-cyclohexanedicarboxylic acid and 1,4-cyclohexanedicarboxylic acid; and aromatic dicarboxylic acids such as terephthalic acid, isophthalic acid, and 2,6-naphthalenedicarboxylic acid. These may be used alone or in combination of two or more kinds thereof. Among these compounds, isophthalic acid is preferred since a polyamide excellent in barrier property can be easily obtained without inhibiting the polycondensation reaction.

In the second polyamide pellet, the polyamide is most preferably poly(m-xylylene adipamide) in which all diamine units consist of constituting units derived from m-xylylenediamine and all the dicarboxylic acid units consist of constituting units derived from adipic acid.

[Needle Descent Temperature]

In the second polyamide pellet, the needle descent temperature of the skin portion of the pellet is 78 to 92° C., and in addition, is higher than the needle descent temperature of the core portion of the pellet, with the temperature difference being 0.1 to 2.5° C.

That is, the second polyamide pellet is a polyamide pellet in which the difference in the needle descent temperature between the skin portion and the core portion is lowered and the needle descent temperature of the skin portion is higher than that of a typical nylon MXD6. Thus, in the second polyamide pellet, presumably, while the difference in thermal property between the core portion and the skin portion is reduced, the pellet can be protected in the skin portion to suppress the oxygen absorption, whereby deterioration of the hue can be prevented. For this reason, for example, a polyamide pellet obtained by subjecting the second polyamide pellet to solid-phase polymerization with heat under a reduced pressure and a molded article obtained by heat molding the pellet are presumed to be prevented from deterioration due to oxidization by reducing oxygen adsorbed inside the pellets, making it possible to maintain good hue.

In the second polyamide pellet, the skin portion refers to a portion to 2% of the pellet diameter from the circumference of the pellet in a cross section perpendicular to the axis direction of the pellet, and the core portion refers to a portion within 70% of a pellet radius from the pellet center. The pellet diameter means the longest diameter in the cross section of the pellet, and the pellet radius means a ½ length of the pellet diameter.

Figure 2:
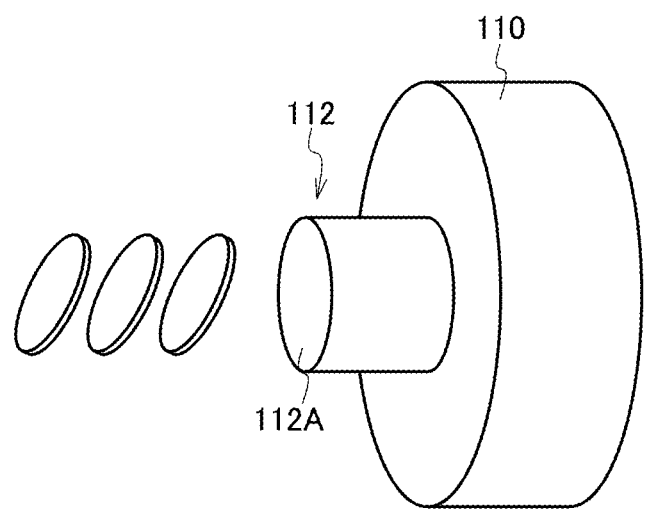
FIG. 2 is a schematic diagram showing a method for taking a sample for measurement of a needle descent temperature form a polyamide pellet.
Figure 3:
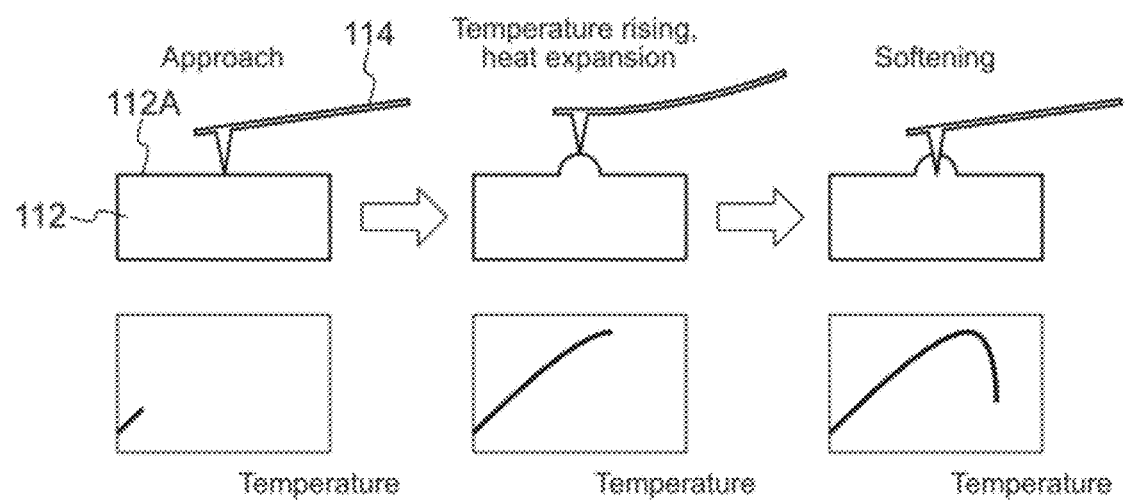
FIG. 3 is a schematic diagram showing a method for measuring a needle descent temperature.

The needle descent temperature is, as shown in FIG. 2, obtained by smoothly cutting a pellet 112 fixed on a support 110 with adhesion using a microtome perpendicularly to the axis direction (equal to the stream direction of the strand before pelletization), and subjecting a smooth surface 112A of the exposed cross section of the pellet 112 to a measurement using a thermal probe by a local thermal analysis. The needle descent temperature specifically refers to, as shown in FIG. 3, a temperature at which a probe 114 in contact with the smooth surface 112A of the sample 112 is converted from rising due to heat expansion of the sample 112 to lowering due to softening thereof. The detail of the measurement method of the needle descent temperature is described later.

In the second polyamide pellet, when the needle descent temperature of the skin portion is lower than 78° C., the pellet is not sufficiently protected by the skin portion, hue of a molded article obtained from the second polyamide pellet and a solid-phase polymerized pellet possibly cannot be made sufficiently good. In addition, in the above polyamide composition, the needle descent temperature is difficult to be enhanced to a temperature higher than 92° C. From the above viewpoints, the needle descent temperature of the skin portion is preferably 80 to 91° C., and more preferably 83 to 90° C.

In the skin portion of the polyamide pellet in which the needle descent temperature is 78° C. or higher, it is presumed that the morphology is in a specific state which is different from a conventional one and the skin portion having the specific morphology protects the pellet. Specifically, when the pellet is cut perpendicularly to the axis direction using a microtome to expose a cross section inside the pellet to prepare a sample and the exposed cross section of the obtained sample is subjected to an ion milling treatment under a prescribed conditions, irregularities are formed based on the morphology and the irregularities in the skin portion are formed more densely than that in the core portion. Such a specific morphology is maintained even in a crystalline state, and, for example, in a pellet obtained by crystallizing the second polyamide pellet through solid-phase polymerization (that is, the first polyamide pellet), the spherulite density of the skin portion is larger than the spherulite density of the core portion.

According to the above characteristics of the skin portion, the surface of the second polyamide pellet is less likely to be scraped. For this reason, it is less likely to occur that the pellet surface is scraped in transferring the pellets to form snake skins (flosses) which adhere to pipes, whereby contamination of products due to the snake skins can be reduced. This is industrially advantageous.

In the second polyamide pellet, the temperature difference between the needle descent temperature of the core portion and the needle descent temperature of the skin portion is 0.1 to 2.5° C. as describe above, more preferably 0.2 to 2° C., and further preferably 0.2 to 1.5° C. When the temperature difference is larger than 2.5° C., the difference in thermal property between the core portion and the skin portion is increased, possibly resulting in unstable physical properties and the like of molded articles. A pellet in which the temperature difference above is less than 0.1° C. is difficult to produce.

[Staining Degree of Pellet]

In the second polyamide pellet, when the pellets stained with a 0.1 mol/L iodine/potassium iodide solution are observed, the proportion of pellets stained at G≤90 (sRGB value) (staining degree) is preferably less than 50%. As described above, the skin portion of the second polyamide pellet is different from conventional one in morphology, and is in a state as if it is a protective layer, and the protection effect can be defined by the staining degree. A smaller staining degree shows a larger protection effect of the pellet surface.

When the staining degree of the second polyamide pellet is less than 50%, the skin portion sufficiently functions as a protection layer and can appropriately prevent oxygen absorption of the pellet. For this reason, hue of a molded article obtained from the second polyamide pellet, a pellet after crystallization through solid-phase polymerization, and the like can be made better. From the above viewpoints, the staining degree is more preferably 20% or less, and further preferably 5% or less. Incidentally, the measurement method of the staining degree is specifically described later.

There are some measures for polymerization degree of polyamide, but relative viscosity is generally used. In the second polyamide pellet, the relative viscosity is preferably 1.8 to 2.4. The polyamide having a relative viscosity within the above range can be easily produced by a melt polycondensation method. Even when the polyamide pellet is used as it is for producing a molded article, the mechanical strength and moldability are relatively high. From the viewpoints, the relative viscosity is more preferably 1.9 to 2.3.

The second polyamide pellet preferably satisfies a condition of the following formula (1):

$$-110 \text{ μeq/g} \leq ([COOH]-[NH_2]) \leq 110 \text{ μeq/g} \quad (1)$$

wherein in the formula (1), [COOH] represents a terminal carboxyl group concentration (μeq/g) of the polyamide and [NH$_2$] represents a terminal amino group concentration (μeq/g) of the polyamide.

As the above, when the difference between the terminal carboxyl group concentration and the terminal amino group concentration is low, heat resistance is improved and color deterioration is less likely to occur. For suppressing the color deterioration more, ([COOH]—[NH$_2$]) is more preferably from −80 to 80 μeq/g.

The second polyamide pellet is generally in an amorphous state, and meanwhile, when measuring the melting point, the second polyamide pellet has a melting point peak and has crystallinity. Accordingly, solid-phase polymerization of the second polyamide pellet results in a crystalline state. The second polyamide pellet has only one melting point peak, and the melting point thereof is not particularly limited, and preferably 200 to 270° C., and more preferably 210 to 260° C.

The size of the second polyamide pellet is not particularly limited, but generally the length along the strand direction (axis direction) is approximately from 1.0 to 4.0 mm, preferably from 2.0 to 3.5 mm. The pellet diameter of the polyamide pellet is generally approximately from 1.0 to 4.0 mm, and preferably from 2.0 to 3.5 mm. The shape of the pellet is not particularly limited, but generally the pellet is cut across the strand as described later and preferably in a cylindrical shape or an elliptic cylindrical shape.

<Production Method of Second Polyamide Pellet>

Next, the production method of the second polyamide pellet is described. The production method of the second polyamide pellet is not particularly limited as long as the second polyamide pellet can be obtained but, for example, the following method may be exemplified.

A production method of the second polyamide pellet in an embodiment of the present invention includes the steps of: extruding a polyamide in a molten state obtained through polycondensation of the diamine and the dicarboxylic acid mentioned above into a strand form; and cutting the polyamide extruded into the strand form while cooling with water to pelletize the polyamide, and then further cooling the pelletized polyamide with water for 4 seconds or more.

Conventionally, in production of MXD6 nylon, the time for water cooling is generally reduced as much as possible in view of a not-so-high temperature after melt polycondensation and constraint in apparatus. In addition, a technique in which a polyamide obtained by polycondensation is extruded into a strand form and cooling the strand as it is with water is known.

In contrast, in this production method, since a polyamide is cooled with water in a state where the polyamide is fragmented into a pellet form and the time for water cooling is prolonged to 4 seconds or more as mentioned above, the temperature of the pellet surface is rapidly lowered, whereby the morphology of the skin portion is made specific as describe above, the needle descent temperature in the skin portion is increased, and the staining degree is lowered.

The core portion of the polyamide pellet is cooled rapidly as well although the cooling rate is slightly lower compared to the skin portion, and while there is a little difference in morphology from the skin portion, the needle descent temperature is a value close to that of the skin portion. For this reason, although the needle descent temperature of the core portion is lower than the needle descent temperature of the skin portion, the temperature difference is reduced as described above.

Incidentally, in this production method, the polycondensation of the diamine and the dicarboxylic acid is preferably performed by a melt polycondensation method.

More specifically, the second polyamide pellet can be produced by a method similar to the method for producing the first polyamide pellet except that the solid-phase polymerization is omitted. That is, the second polyamide pellet can be produced by performing the steps until the polycondensate polyamide pellet is produced in the production method of the first polyamide pellet described in more detail above.

The first polyamide pellet after solid-phase polymerization produced by the above production method is specific in morphologies of the skin portion and the core portion, and thus the spherulite densities in the skin portion and the core portion are specific.

Similarly, by producing the second polyamide pellet by the above production method, even before the solid-phase polymerization, the morphologies of the skin portion and the core portion are specific. For this reason, in the second polyamide pellet including a polyamide in which 50% by mole or more of the diamine units are derived from m-xylylenediamine and 70% by mole or more of the dicarboxylic acid units are derived from adipic acid, the needle descent temperatures of the skin and core portions are in a certain ranges as described above. When the second polyamide pellet is subjected to solid-phase polymerization or molding-processed, the hue of the polyamide pellet after solid-phase polymerization and a molded article can be improved.

The second polyamide pellet of the present invention can be molded into a molded article having a desired shape by a known molding method such as injection molding, blow molding, extrusion, compression molding, extension, and vacuum molding, after being mixed with any other components as required. As specific examples of the molded article, as described above, the same molded articles as those molded from the first polyamide pellet may be mentioned.

In addition, the second polyamide pellet of the present invention may be formed into a pellet increased in molecular weight and crystallized through further solid-phase polymerization. The pellet increased in molecular weight and crystallized can also be molded into various molded articles by various molding methods as with the above.

As described above, in the second polyamide pellet, by increasing the needle descent temperature in the skin portion while reducing the temperature difference in the needle descent temperature between the skin portion and the core portion, the morphology of the skin portion can be made into a specific form while reducing the difference in thermal property between the core portion and the skin portion. This provides a polyamide pellet in an amorphous state in which the pellet is protected on the pellet surface and the hue is not deteriorated even when a thermal history is exerted. Accordingly, hue of a solid-phase polymerized pellet or a molded article obtained from the second polyamide pellet of the present invention can be improved.

Incidentally, in each of the first and the second polyamide pellets of the present invention, the polyamide may contain, besides the diamine units and the dicarboxylic acid units, units derived from other monomer components, for example, lactams such as ω-caprolactam, ω-laurolactam, and ω-enantholactam, amino acids such as 6-aminocaproic acid, 7-aminoheptanoic acid, 11-aminoundecanoic acid, 12-aminododecanoic acid, 9-aminononanoic acid, and p-aminomethylbenzoic acid, and the like, to the extent that does not impair the performance. However, the diamine units and the dicarboxylic acid units are main components in the polyamide, and the total sum thereof is not particularly limited, but generally approximately 80% by mole or more of all the constituting units, and preferably 90% by mole or more.

In each of the first and the second polyamide pellets of the present invention, any other components other than the polyamide may be appropriately contained to the extent that does not impair the performance. However, the polyamide is a main component in the pellet, and the content thereof in the entire pellet is not particularly limited, but generally approximately 80% by mass or more, and preferably 90% by mass or more.

EXAMPLES

The present invention is described in more detail below with reference to examples, but the present invention is not to be limited thereto. In the present examples, the measurements are conducted by the following methods. The pressures shown below are absolute pressures unless otherwise specified.

(1) Spherulite Density

A first polyamide pellet was cut perpendicularly to the axis direction using a microtome to expose a cross section at the center in the axis direction of the pellet as a smooth surface to prepare a sample in a block shape, and the sample obtained was put in a 10 wt % aqueous phosphorus/tungstic acid solution to stain the sample at 80° C. for 8 hours. Then, using an ion milling apparatus (trade name: IM4000, manufactured by Hitachi High-Technologies Corporation), the smooth surface was irradiated with an ion beam under conditions of an accelerated voltage of 2.5 kV, a discharge voltage of 1.5 kV, a processing time of 6 min, an irradiation angle of 30 degrees, and an eccentricity of 1.5 mm to form a damage pattern due to a morphology on the surface of the sample, and using a scanning electron microscope (trade name; SU8020, manufactured by Hitachi High-Technologies Corporation), the surface was observed at a magnification of 1,000. The damage pattern due to crystal was determined from an image obtained and the number of spherulites in arbitrary area of 50 µm square in each of the skin portion and the core portion was counted, and the procedure was repeated three times, whereby the spherulites density of each of the skin portion and the core portion was measured. In the above measurement, a part in which 70% or more of the circumference thereof was surrounded by a line formed by the damage pattern was counted as one spherulite.

(2) [COOH]—[NH$_2$]

Polyamide pellets (0.3 to 0.5 g) were weighed, and dissolved in 30 ml of benzyl alcohol with stirring at 160 to 180° C. under nitrogen gas stream. After completely dissolved, the solution was cooled to a prescribed temperature under nitrogen gas stream, 10 ml of methanol was added while stirring, and then subjected to neutralization titration with a 0.01 mol/l aqueous sodium hydroxide solution to measure the terminal carboxyl group concentration ([COOH]). Incidentally, for the first polyamide pellet (that is, crystallized polyamide pellet), the prescribed temperature was set to 80° C., and for the second polyamide pellet (that is, polycondensate polyamide pellet), the prescribed temperature was set to 50° C.

Polyamide pellets (0.3 to 0.5 g) were weighed, and dissolved with stirring in 30 ml of a phenol/ethanol mixed solution (mixing volume ratio, 4:1) at room temperature. After completely dissolved, the solution was subjected to neutralization titration while stirring with a 0.01 mol/l aqueous hydrochloride solution to determine the terminal amino group concentration ([NH$_2$]). [COOH]—[NH$_2$] was calculated from the thus measured terminal carboxyl group concentration and terminal amino group concentration.

(3) Relative Viscosity

A sample (0.2 g) was weighed, and completely dissolved with stirring in 20 ml of 96 mass % sulfuric acid at 20 to 30° C. to prepare a solution. Then, 5 ml of the solution was immediately placed in a Cannon Fenske viscometer, left to stand in a 25° C. thermostat bath for 10 minutes, and the dropping time (t) was measured. The dropping time of the 96 mass % sulfuric acid itself (t$_0$) was also measured similarly. From t and t$_0$, the relative viscosity was calculated according to the following formula.

Relative viscosity=$t/t_0$ (4) Melting Point (Tm)

Using a differential scanning calorimeter (manufactured by Shimazu Corporation, trade name: DSC-60), DSC measurement (differential scanning calorimetry) was performed at a temperature rising rate of 10° C./min under nitrogen gas stream to obtain the melting point (Tm).

(5) Yellow Degree YI

Using ZE-2000 manufactured by Nippon Denshoku Industries Co. Ltd., the state of a pellet was measured based on JIS K7373.

(6) Crystallinity

By a differential scanning calorimeter (manufactured by Shimazu Corporation, trade name: DSC-60), measurement was performed under a condition of a temperature rising rate of 10° C./min under nitrogen atmosphere, and the crystallinity was calculated from the ratio of the measured heat of fusion ΔH to the heat of fusion of perfect crystal of the polymer ΔHm according to the following formula.

Crystallinity=ΔH/ΔHm×100[%]

(7) Needle Descent Temperature

Using VESTA Nano-TA manufactured by Anasys Instrument as a measurement apparatus and using a probe having a tip diameter of 30 nm as a probe, a needle descent temperature was measured by a thermal probe nano-TA as follows.

A second polyamide pellet (polycondensate polyamide pellet) was fixed on an epoxy block and cut using a microtome to expose a cross section perpendicular to the axis direction (equal to the stream direction of the strand before palletization) at the center in the axis direction of the pellet as a smooth surface, thereby preparing a sample for measurement. In the measurement, the sample was heated at 100° C./min, and the temperature at which the displacement of the probe in contact with the smooth surface of the sample was converted from rising to lowering was taken as the needle descent temperature. The needle descent temperature of the core portion was measured at arbitrary 6 points in the portion within 70% of the pellet radius from the center of the smooth surface of the pellet, the needle descent temperature of the skin portion was measured at arbitrary 6 points in the portion within 2% of the pellet diameter from the circumference of the pellet, and the arithmetical means thereof were taken as the respective needle descent temperatures.

(8) Staining Degree of Pellet

Second polyamide pellets (polycondensate polyamide pellets) (5 g) were dipped in a 0.1 mol/L iodine/potassium iodide solution (prepared with iodine: 0.5 g, potassium iodide: 1.0 g, and water: 100 ml), and left to stand at 23° C. for 12 hours to stain the polyamide pellets, and the stained polyamide pellets were rinsed with water, and then dried at a room temperature (23° C.). The thus obtained stained pellets were arranged on a white plate (X=90, Y=94 and Z=111 in the XYZ color system), and the pellets were imaged under a LED light source (PTU-3024 manufactured by CCS) using a CCD camera (XCL-U1000C manufactured by Sony). At this time, the sensitivity of the camera was controlled so that the pellets do not reflect the light source, and further that the sRGB values in the case of imaging the white plate alone satisfy 140≤R≤150, 175≤G≤190, and 135≤B≤150. The stained pellets were imaged under the above conditions, and the proportion of the pellets satisfying G≤90 was determined.

(9) Conditions for Ion Milling Observation of Second Polyamide Pellet

A second polyamide pellet (polycondensate polyamide pellet) was cut perpendicularly to the axis direction using a microtome to expose a cross section inside the pellet as a smooth surface, thereby preparing a sample in a block shape, and the obtained sample was put in a 10 wt % aqueous phosphorus/tungstic acid solution to stain the sample at 80° C. for 8 hours. Then, using an ion milling apparatus (trade name: IM4000, manufactured by Hitachi High-Technologies Corporation), the smooth surface was irradiated with an ion beam under conditions of an accelerated voltage of 2.5 kV, a discharge voltage of 1.5 kV, a processing time of 6 min, an irradiation angle of 30 degrees, and an eccentricity of 1.5 mm to form a damage pattern due to a morphology on the surface of the sample, and using a scanning electron microscope (trade name; SU8020, manufactured by Hitachi High-Technologies Corporation), the surface was observed at a magnification of 1,000.

Example 1

Using a 500 little stainless batch reactor equipped with a tank for dropwise addition of diamine and a pump, in which the entire surface of a partial condenser having thermoregulated oil flowed therein, a total condenser, a nitrogen gas introduction pipe, and a reaction chamber was covered with a jacket having oil flowed therein, a polyamide was synthesized as follows.

Adipic acid (purity: 99.85 wt %, 150.0 kg (1024.9 mol)) was charged, fully purged with nitrogen, and then heated to 190° C. while stirring at a pressure of 0.1 MPa. After the temperature was reached, 8.6 g of sodium hypophosphite monohydrate (5 ppm as the phosphorus atom concentration in the polyamide) was added, and 138.8 kg (1018.7 mol) of m-xylylenediamine (purity: 99.99 wt %) was added dropwise over 110 minutes while maintaining the pressure in the reactor at 0.1 MPa. The heat was controlled so that the temperature at the end of the dropwise addition of the diamine was 240° C., the steam temperature at the outlet of the partial condenser was controlled at 101 to 104° C., and the released steam was condensed through the total condenser and discharged out of the system. After the end of the dropwise addition of the diamine, the pressure was kept with stirring at 0.1 MPa for 20 minutes, then reduced to 80 kPa, and further kept with stirring for 20 minutes. During the period from the end of the dropwise addition of the diamine to the end of the pressure reduction, the temperature of the reaction liquid was increased to 256° C.

After the completion of the reaction, stirring was stopped, the inside of the reactor was pressurized with nitrogen to 0.30 MPa (gage pressure), and the polymer was drawn out into a strand form at 256° C. from a strand die (die diameter: 8 mm) at the bottom of the reactor with a die valve opening being 60%. The drawn strand was landed on water in a water tank with a water temperature of 25° C., and at 0.8 seconds after the water landing, the strand was cut and pelletized by a water slider-shaped pelletizer in the water tank. Then, the pelletized polyamide was fed in the water tank while being cooled continuously in the water tank, and allowed to leave water at 5.9 seconds after the cutting, whereby a pelletized polyamide in an amorphous state was obtained. The obtained pellet had a length of 3 mm and a pellet diameter of 3 mm, the temperature of the pellets after the end of the cooling was 40° C. The receiving rate of the cutter in the pelletizer was 200 m/min.

Incidentally, the pellets taken out of the water tank were immediately stored in a temporary storage container, and a temperature measured by inserting a sheath thermocouple in the plural pellets in the storage container was taken as the pellet temperature after the end of the water cooling. The method for measuring the pellet temperature after the end of the water cooling is the same in the following examples and comparative examples.

The obtained pelletized polyamide in an amorphous state (polycondensate polyamide pellet) has a crystallinity of 18%, YI=−3, ([COOH]−[NH$_2$])=46 µeq/g, a relative viscosity of 2.1, a melting point (Tm) of 239° C., and a needle descent temperature in the skin portion of 85.5° C., and a needle descent temperature of the core portion of 84.8° C., and the proportion of pellets stained at G≤90 when the pellets are stained with a 0.1 mol/L iodine/potassium iodide solution (staining degree) was 1%.

When the obtained polycondensate polyamide pellet was subjected to ion milling to observe the pellet, irregularities were densely formed to a point of about 30 µm from the circumferential surface of the pellet, and in the portion on the center side of the position (core portion), irregularities were coarsely formed, and thus the morphology of the skin portion of the polyamide pellet was in a specific state.

Next, after the polycondensate polyamide pellets were cooled in air by being left to stand in air of normal temperature (23° C.) for 6 hours, the pellets were subjected to solid-phase polymerization. The solid-phase polymerization was conducted by putting 150 kg of the pelletized polyamide in an amorphous state in a 250 L stainless tumbler, and after the putting of the raw material, while keeping the pressure in the tumbler at 1.0 kPa or lower, increasing the temperature to 130° C. over 3 hours, and further increasing the temperature to 195° C. over 3 hours, followed by cooling. The results of evaluation of the polyamide pellets (the first polyamide pellets) obtained by the solid-phase polymerization are shown in Table 1.

Figure 4:
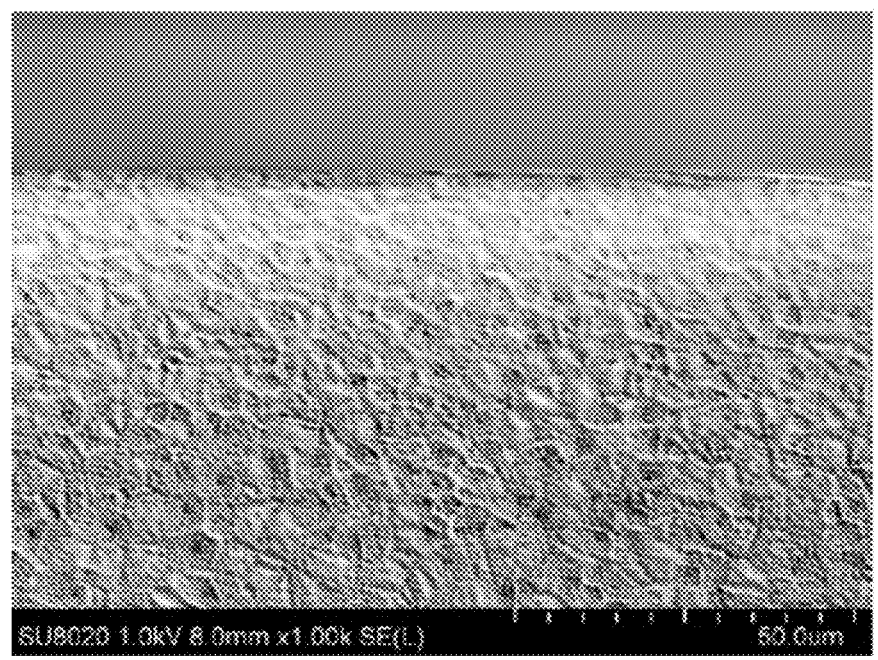
FIG. 4 shows an enlarged photograph of the skin portion of the polyamide pellet after ion milling in Example 1.
Figure 5:
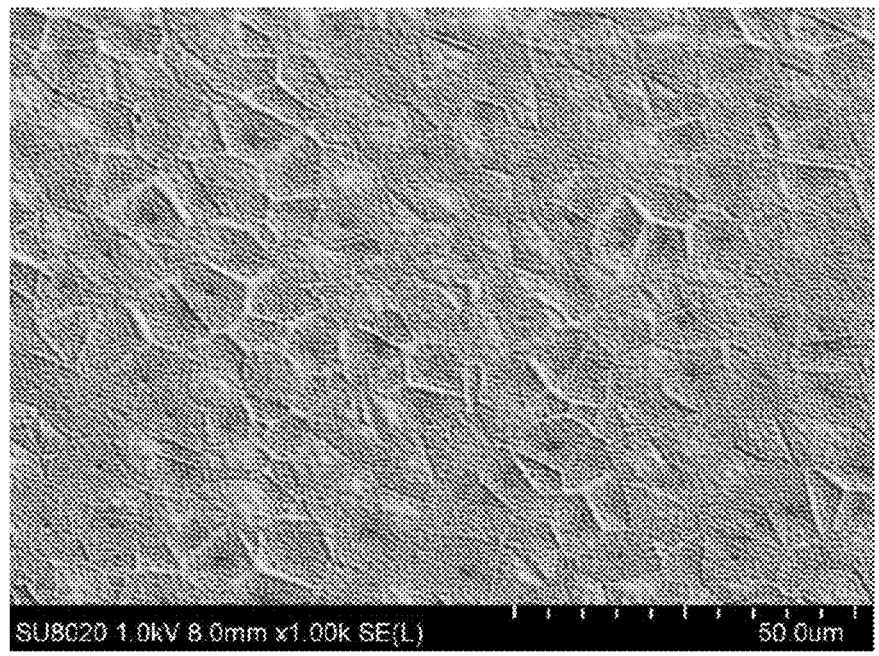
FIG. 5 shows an enlarged photograph of the core portion of the polyamide pellet after ion milling in Example 1.

According to the measurement method of the spherulite density described above, images observed after irradiating a flake sample of the polyamide pellet with an ion beam are shown in FIGS. 4 and 5. FIG. 4 is a photograph of the skin portion, and FIG. 5 is a photograph of the core portion.

Example 2

Using a 500 little stainless batch reactor equipped with a tank for dropwise addition of diamine and a pump, in which the entire surface of a partial condenser having thermoregulated oil flowed therein, a total condenser, a nitrogen gas introduction pipe, and a reaction chamber was covered with a jacket having oil flowed therein, a polyamide was synthesized as follows.

Adipic acid (purity: 99.85 wt %, 150.0 kg (1024.9 mol)) was charged, fully purged with nitrogen, and then heated to 190° C. while stirring at a pressure of 0.4 MPa. After the temperature was reached, 8.6 g of sodium hypophosphite monohydrate was added, 138.8 kg (1018.8 mol) of m-xylylenediamine (purity: 99.99 wt %) was added dropwise over 110 minutes while maintaining the pressure in the reactor at 0.4 MPa. The heat was controlled so that the temperature at the end of the dropwise addition of the diamine was 240° C., the steam temperature at the outlet of the partial condenser was controlled at 101 to 104° C., and the released steam was condensed through the total condenser and discharged out of the system. After the end of the dropwise addition of the diamine, the pressure was kept at 0.4 MPa for 20 minutes while stirring, dropped to normal pressure at a rate of 0.01 MPa/min over 30 minutes, then further reduced to 80 kPa, and further kept with stirring for 20 minutes. During the period from the end of the dropwise addition of the diamine to the end of the pressure reduction, the temperature of the reaction liquid was increased to 256° C.

After the completion of the reaction, the stirring was stopped, the inside of the reactor was pressurized with nitrogen to 0.30 MPa (gage pressure), and the polymer was drawn out in a strand form at 256° C. from a strand die (die diameter: 8 mm) at the bottom of the reactor with a die valve opening being 60%. The drawn strand was landed on water in a water tank with a water temperature of 25° C., and after at 0.7 seconds after the water landing, the strand was cut and pelletized by a water slider-shaped pelletizer in the water tank. Then, the pelletized polyamide was fed in the water tank while being cooled continuously in the water tank, and allowed to leave water at 5.0 seconds after the cutting, whereby a pelletized polyamide in an amorphous state was obtained. The obtained pellet had a length of 3 mm and a pellet diameter of 3 mm, and the temperature of the pellets after the end of the water cooling was 45° C. The receiving rate of the cutter in the pelletizer was 200 m/min.

The obtained pelletized polyamide in an amorphous state (polycondensate polyamide pellet) had a crystallinity of 19%, YI=-2, ([COOH]—[NH$_2$])=49 µeq/g, a relative viscosity of 2.1, a melting point (Tm) of 239° C., a needle descent temperature of the skin portion of 86.3° C., and a needle descent temperature of the core portion of 85.2° C., and the proportion of pellets stained at G≤90 when a 0.1 mol/L iodine/potassium iodide solution (staining degree) was 15%.

When the obtained polycondensate polyamide pellet was subjected to ion milling observation, irregularities were densely formed to a position of 30 µm from the pellet surface, and irregularities were coarsely formed on the center side of the position, and thus the morphology of the skin portion of the polyamide pellet was in a specific state.

After the polycondensate polyamide pellets obtained were cooled in air by being left to stand in air of normal temperature (23° C.) for 6 hours, the pellets were subjected to solid-phase polymerization under the same conditions as in Example 1. The results of evaluation of the polyamide pellets obtained by the solid-phase polymerization are shown in Table 1.

Example 3

Using a 500 little stainless batch reactor equipped with a tank for dropwise addition of diamine and a pump, in which the entire surface of a partial condenser having thermoregulated oil flowed therein, a total condenser, a nitrogen gas introduction pipe, and a reaction chamber was covered with a jacket having oil flowed therein, a polyamide was synthesized as follows.

Adipic acid (purity: 99.85 wt %, 150.0 kg (1024.9 mol)) was charged, fully purged with nitrogen, and then heated to 190° C. while stirring at a pressure of 0.4 MPa. After the temperature was reached, 8.6 g of sodium hypophosphite monohydrate was added, 138.8 kg (1018.7 mol) of a m-xylylenediamine/p-xylylenediamine mixture (molar ratio: 80/20) (purity: 99.99 wt %) was added dropwise over 110 minutes while maintaining the pressure in the reactor at 0.4 MPa. The heat was controlled so that the temperature at the end of the dropwise addition of the diamines was 258° C., the steam temperature at the outlet of the partial condenser was controlled at 143 to 147° C., and the released steam was condensed through the total condenser and discharged out of the system. After the end of the dropwise addition of the diamines, the pressure was kept at 0.4 MPa for 20 minutes while stirring, dropped to normal pressure at a rate of 0.01 MPa/min over 30 minutes, then further reduced to 80 kPa, and further kept with stirring for 20 minutes. During the period from the end of the dropwise addition of the diamines to the end of the pressure reduction, the temperature of the reaction liquid was increased to 260° C.

After the completion of the reaction, the stirring was stopped, the inside of the reactor was pressurized with nitrogen to 0.30 MPa (gage pressure), and the polymer was drawn out in a strand form at 260° C. from a strand die (die diameter: 8 mm) at the bottom of the reactor with a die valve opening being 60%. The drawn strand was landed on water in a water tank with the water temperature of 25° C., and at 0.8 seconds after the water landing, the strand was cut and pelletized by a water slider-shaped pelletizer in the water tank. Then, the pelletized polyamide was fed in the water tank while being cooled continuously in the water tank, and allowed to leave water at 5.9 seconds after the cutting, whereby a pelletized polyamide in an amorphous state was obtained. The obtained pellet had a length of 3 mm, a pellet diameter of 3 m, and the temperature of the pellets after the end of the water cooling was 50° C. The receiving rate of the cutter in the pelletizer was 200 m/min.

The obtained pelletized polyamide in an amorphous state (polycondensate polyamide pellet) had a crystallinity of 20%, YI=-1, ([COOH]—[NH$_2$])=43 µeq/g, a relative viscosity of 2.1, a melting point (Tm) of 253° C., and a needle descent temperature of the skin portion of 87.2° C., and a needle descent temperature of the core portion of 85.8° C., and the proportion of pellets stained at G≤90 when being stained with a 0.1 mol/L iodine/potassium iodide solution (staining degree) was 45%.

In addition, when the obtained polycondensate polyamide pellet was subjected to ion milling observation, irregularities were densely formed to a position of 30 µm from the pellet surface, and irregularities were coarsely formed on the center side of the position, and thus the morphology of the skin portion of the polyamide pellet was in a specific state.

After the polycondensate polyamide pellets obtained were cooled in air by being left to stand in air of normal temperature (23° C.) for 6 hours, the pellets were subjected to solid-phase polymerization under the same conditions as in Example 1. The results of evaluation of the polyamide pellets obtained by the solid-phase polymerization are shown in Table 1.

Comparative Example 1

A polyamide was synthesized by a reaction under the same conditions as in Example 1.

After the completion of the reaction, the stirring was stopped, the inside of the reactor was pressurized with nitrogen to 0.30 MPa (gage pressure), and the polymer was drawn out in a strand form at 256° C. from a strand die (die diameter: 8 mm) at the bottom of the reactor with a die valve opening being 60%. The drawn strand was landed on water in a water tank with a water temperature of 25° C., and at 0.8 seconds after the water landing, the strand was cut and pelletized by a water slider-shaped pelletizer in the water tank. Then, the pelletized polyamide was fed in the water tank while being cooled continuously in the water tank, and allowed to leave water at 2.8 seconds after the cutting, whereby a pelletized polyamide in an amorphous state was obtained. The obtained pellet had a length of 3 mm, a pellet diameter of 3 mm, and the temperature of the pellets after the end of the water cooling was 70° C. The receiving rate of the cutter in the pelletizer was 200 m/min.

The obtained pelletized polyamide in an amorphous state (polycondensate polyamide pellet) had a crystallinity of 18%, YI=-2, ([COOH]—[NH$_2$])=45 µeq/g, a relative viscosity of 2.1, a melting point (Tm) of 239° C., a needle descent temperature of the skin portion of 76.8° C., a needle descent temperature of the core portion of 73.8° C., and the proportion of pellets stained at G≤90 when being stained with a 0.1 mol/L iodine/potassium iodide solution (staining degree) was 60%.

In addition, when the obtained polycondensate polyamide pellet was subjected to ion milling observation, dense irregularities were slightly formed in the vicinity of the pellet surface, but the portion where the irregularities were densely formed was 10 μm or so from the surface, and irregularities were coarsely formed in the remaining portion.

After the polycondensate polyamide pellets obtained were cooled in air by being left to stand in air of normal temperature (23° C.) for 6 hours, the pellets were subjected to solid-phase polymerization under the same conditions as in Example 1. The results of evaluation of the polyamide pellets obtained by the solid-phase polymerization are shown in Table 1.

Figure 6:
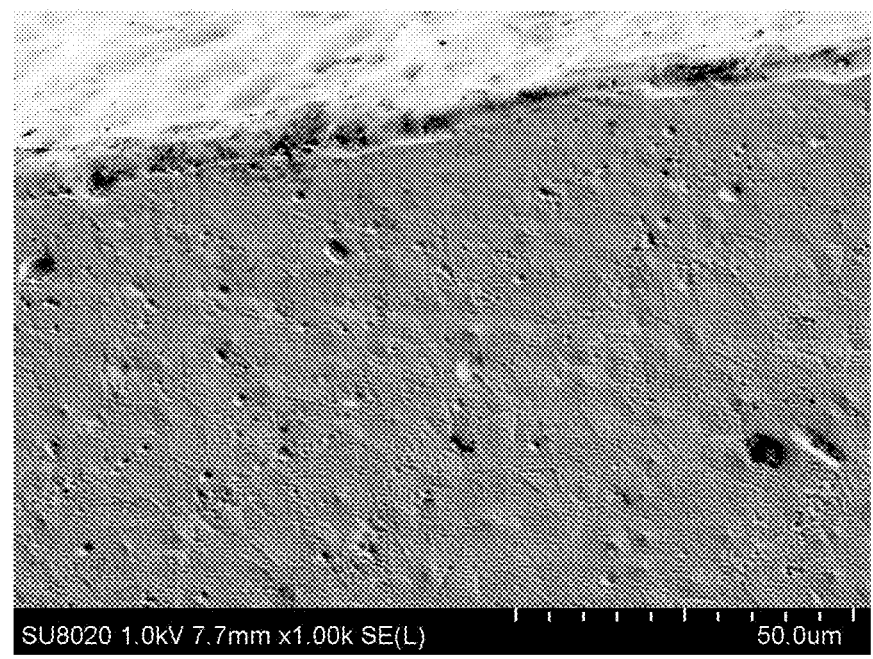
FIG. 6 shows an enlarged photograph of the skin portion of the polyamide pellet after ion milling in Comparative Example 1.

According to the measurement method of the spherulite density described above, an image of the skin portion observed after irradiating a flake sample of the polyamide pellet with an ion beam is shown in FIG. 6.

Comparative Example 2

A polyamide was synthesized by a reaction under the same conditions as in Example 3.

After the completion of the reaction, the stirring was stopped, the inside of the reactor was pressurized with nitrogen to 0.30 MPa (gage pressure), and the polymer was drawn out in a strand form at 260° C. from a strand die (die diameter: 8 mm) at the bottom of the reactor with a die valve opening being 60%. The drawn strand was landed on water in a water tank with a water temperature of 25° C., and at 0.8 seconds after the water landing, the strand was cut and pelletized by a water slider-shaped pelletizer in the water tank. Then, the pelletized polyamide was fed in the water tank while being cooled continuously in the water tank, and allowed to leave water at 2.8 seconds after the cutting, whereby a pelletized polyamide in an amorphous state was obtained. The obtained pellet had a length of 3 mm, a pellet diameter of 3 mm, and the temperature of the pellets after the end of the water cooling was 75° C. The receiving rate of the cutter in the pelletizer was 200 m/min.

The obtained pelletized polyamide in an amorphous state (polycondensate polyamide pellet) had a crystallinity of 17%, YI=−1, ([COOH]—[NH$_2$])=44 μeq/g, a relative viscosity of 2.1, a melting point (Tm) of 253° C., a needle descent temperature of the skin portion of 77.8° C., and a needle descent temperature of the core portion of 75.3° C., and the proportion of pellets stained at G≤90 when being stained with a 0.1 mol/L iodine/potassium iodide solution (staining degree) was 70%.

When the polycondensate polyamide pellet obtained was subjected to ion milling observation, dense irregularities were slightly formed in the vicinity of the pellet surface, but the portion where the irregularities were densely formed was 10 μm or so from the surface, and irregularities were coarsely formed in the remaining portion.

After the polycondensate polyamide pellets obtained were cooled in air by being left to stand in air of normal temperature (23° C.) for 6 hours, the pellets were subjected to solid-phase polymerization under the same conditions as in Example 1. The various properties of the polyamide pellets obtained by the solid-phase polymerization are shown in Table 1.

TABLE 1

|  |  |  |  | Example 1 | Example 2 | Example 3 | Comparative Example 1 | Comparative Example 2 |
|---|---|---|---|---|---|---|---|---|
| Production Conditions | Polyamide (mol %) | Diamine | MXDA | 100 | 100 | 80 | 100 | 80 |
|  |  |  | PXDA | 0 | 0 | 20 | 0 | 20 |
|  |  | Dicarboxylic acid | Adipic acid | 100 | 100 | 100 | 100 | 100 |
|  | Strand drawing out temperature | ° C. |  | 256 | 256 | 260 | 256 | 260 |
|  | Water tank temperature | ° C. |  | 25 | 25 | 25 | 25 | 25 |
|  | Water landing time | sec | Strand water landing – Pelletizer | 0.8 | 0.7 | 0.8 | 0.8 | 0.8 |
|  |  |  | Pelletizer – Pellet leaving water | 5.9 | 5.0 | 5.9 | 2.8 | 2.8 |
|  |  |  | Total (Strand landing water – Pellet leaving water) | 6.7 | 5.7 | 6.7 | 3.6 | 3.6 |
|  | Pellet temperature after end of water cooling | ° C. |  | 40 | 45 | 50 | 70 | 75 |
|  | Pellet size | mm | Length | 3 | 3 | 3 | 3 | 3 |
|  |  |  | Diameter | 3 | 3 | 3 | 3 | 3 |
| Before solid-phase polymerization | Crystallinity | % |  | 18 | 19 | 20 | 18 | 17 |
|  | Yellow index (YI) |  |  | −3 | −2 | −1 | −2 | −1 |
|  | [NH$_2$]—[COOH] | μeq/g |  | 46 | 49 | 43 | 45 | 44 |
|  | Relative viscosity |  |  | 2.1 | 2.1 | 2.1 | 2.1 | 2.1 |
|  | Melting point | ° C. |  | 239 | 239 | 253 | 239 | 253 |
|  | Needle descent temperature | ° C. | Skin | 85.5 | 86.3 | 87.2 | 76.8 | 77.8 |
|  |  |  | Core | 84.8 | 85.2 | 85.8 | 73.8 | 75.3 |
|  |  |  | (Skin – Core) | 0.7 | 1.1 | 1.4 | 3 | 2.5 |
|  | Proportion of pellets stained at G ≤90 | % |  | 1 | 15 | 45 | 60 | 70 |
|  | Ion milling observation: depth from surface layer of dense irregularities portion | μm |  | 30 | 30 | 30 | 10 | 10 |

TABLE 1-continued

|  |  |  |  | Example | | | Comparative Example | |
|---|---|---|---|---|---|---|---|---|
|  |  |  |  | 1 | 2 | 3 | 1 | 2 |
| After solid-phase polymerization | Spherulite density | /mm² | Skin | 86000 | 98000 | 92000 | N/A | N/A |
|  |  |  | Core | 25000 | 22000 | 24000 | N/A | N/A |
|  | Yellow index (YI) |  |  | −8 | −5 | −4 | −3 | −2 |
|  | ΔYI |  |  | −5 | −3 | −3 | −1 | −1 |
|  | [NH₂]—[COOH] | μeq/g |  | 46 | 50 | 42 | 44 | 45 |
|  | Relative viscosity |  |  | 2.6 | 2.6 | 2.6 | 2.6 | 2.6 |
|  | Melting point | ° C. |  | 239 | 239 | 253 | 239 | 253 |

\* ΔYI is a value determined by subtracting YI before solid-phase polymerization from YI after solid-phase polymerization.
N/A: not available In Examples 1 to 3, since the spherulite density of the skin portion was large and spherulites existed densely therein, the pellet was protected in the skin portion and the yellow index YI of the obtained polyamide pellets could be made good. On the other hand, in Comparative Examples 1 and 2, when observed after ion milling, both in the skin portion and the core portion, the pattern based on spherulites was not clear and the spherulite density was difficult to measure. Accordingly, spherulites in the skin portion were not formed clearly, and if present, it is considered that spherulites did not exist densely, and the pellet was not sufficiently protected in the skin portion. Accordingly, the yellow index YI of the polyamide pellets obtained was deteriorated compared with those in Examples.

In addition, in Examples 1 to 3, while reducing the difference in the needle descent temperature between the skin portion and the core portion of the polycondensate polyamide pellet before solid-phase polymerization, the needle descent temperature of the skin portion was increased. Accordingly, the yellow index YI of the polyamide pellets after solid-phase polymerization was also improved. On the other hand, in Comparative Examples 1 and 2, the needle descent temperature of the skin portion of the pellet was low, and the yellow index YI of the pellets after solid-phase polymerization was deteriorated compared with those in Examples.

Example 4

[Production of Polyamide Molded Article by Twin Screw Extruder]

A twin screw extruder having a screw diameter of 30 mm was provided, and a T-die was attached to the tip end. In the twin screw extruder, the temperatures C1/C2/C3/C4/H/D were set to 230° C./270° C./270° C./270° C./270° C./270° C., respectively. Incidentally, C1 to C4 represent temperatures of the cylinder designated sequentially from the feeding part side. The polyamide pellets obtained by solid-phase polymerization in Example 1 were charged in a hopper of the twin screw extruder, and the polyamide pellets were plasticized and kneaded in the cylinder at a screw rotation speed of 100 rpm, and extruded for 60 minutes into a polyamide molded article having a film form of a thickness of 0.05 mm and a width of 250 mm by the T-die. By measuring the motor load amplitude during the period, the processability was evaluated.

[Production of Polyamide Molded Article by First Single Screw Extruder]

A single screw extruder (first single screw extruder) having a screw formed of a full-flight screw having a diameter D of 25 mm, with L/D being 24, the compression ratio (C/R) being 3.0, L1/L2/L3 being 0.50/0.12/0.38 and a T-die being attached to the tip end was provided, and in the single screw extruder, the temperatures C1/C2/C3/H/D were respectively set to 230° C./260° C./265° C./265° C./260° C. The polyamide pellets obtained by solid-phase polymerization in Example 1 (the first polyamide pellet) were charged in a hopper of the single screw extruder, and the polyamide pellets were plasticized and kneaded in a cylinder at a screw rotation speed of 50 rpm, and extruded for 60 minutes into a polyamide molded article of a film form having a thickness of 0.05 mm and a width of 200 mm by the T-die. By measuring the motor load amplitude during the period, the processability was evaluated.

[Production of Polyamide Molded Article by Second Single Screw Extruder]

A single screw extruder (second single screw extruder) having a screw formed of a full-flight screw having a diameter D of 40 mm, with L/D being 26, the compression ratio (C/R) being 3.2, L1/L2/L3 being 0.50/0.12/0.38 and a T-die being attached to the tip end was provided, and in the single screw extruder, the temperatures C1/C2/C3/H/D were respectively set to 250° C./260° C./265° C./265° C./260° C. The polyamide pellets obtained by solid-phase polymerization in Example 1 (the first polyamide pellet) were charged in a hopper of the single screw extruder, and the polyamide pellets were plasticized and kneaded in a cylinder at a screw rotation speed of 60 rpm, and extruded for 60 minutes into a polyamide molded article of a film form having a thickness of 0.1 mm and a width of 400 mm by the T-die. By measuring the motor load amplitude during the period, the processability was evaluated.

Example 5

A polyamide was produced in the same manner as in Example 1, except that when the polyamide pellets were produced, the pressure of nitrogen added at the time of drawing out the polymer was 0.35 MPa (gage pressure), and that the die valve opening was 70%. By using the obtained polyamide pellets after solid-phase polymerization, polyamide molded articles were produced by the twin screw extruder, the first single screw extruder, and the second single screw extruder in the same manner as in Example 4 to evaluate the processability.

Example 6

A polyamide was produced in the same manner as in Example 1, except that when the polyamide pellets were produced, the pressure of nitrogen added at the time of drawing out the polymer was 0.40 MPa (gage pressure) and that the die valve opening was 80%. By using the obtained polyamide pellets after solid-phase polymerization, polyamide molded articles were produced by the twin screw extruder, the first single screw extruder, and the second single screw extruder in the same manner as in Example 4 to evaluate the processability.

Example 7

By using the polyamide pellets obtained by solid-phase polymerization in Example 2, polyamide molded articles were produced by the twin screw extruder, the first single screw extruder, and the second single screw extruder in the same manner as in Example 4 to evaluate the processability.

Example 8

A polyamide molded article was produced using the twin screw extruder, the first single screw extruder, and the second single screw extruder in the same manner as in Example 4, except that the polyamide pellets obtained by solid-phase polymerization in Example 3 were used and that the temperatures C1/C2/C3/H/D of the first single screw extruder were set to 230° C./275° C./280° C./280° C./275° C. and that the temperatures C1/C2/C3/H/D of the second single screw extruder were set to 250° C./275° C./280° C./280° C./275° C., and the processability was evaluated.

Example 9

A polyamide pellet was produced in the same manner as in Example 1, except that when the polyamide pellets were produced, the pressure of nitrogen added at the time of drawing out the polymer was 0.25 MPa (gage pressure) and that the die valve opening was 30%. By using the obtained polyamide pellets after solid-phase polymerization, polyamide molded articles were produced by the twin screw extruder, the first single screw extruder, and the second single screw extruder to evaluate the processability.

Example 10

A polyamide pellet was produced in the same manner as in Example 1, except that when the polyamide pellets were produced, the pressure of nitrogen added at the time of drawing out the polymer was 0.50 MPa (gage pressure) and that the die valve opening was 100%. By using the obtained polyamide pellets after solid-phase polymerization, polyamide molded articles were produced by the twin screw extruder, the first single screw extruder, and the second single screw extruder to evaluate the processability.

Comparative Example 3

By using the polyamide pellets obtained by solid-phase polymerization in Comparative Example 1, polyamide molded articles were produced by the twin screw extruder, the first single screw extruder, and the second single screw extruder in the same manner as in Example 4.

Comparative Example 4

By using the polyamide pellets obtained by solid-phase polymerization in Comparative Example 2, polyamide molded articles were produced by the twin screw extruder, the first single screw extruder, and the second single screw extruder in the same manner as in Example 8.

TABLE 2

|  | Example 4 | Example 5 | Example 6 | Example 7 | Example 8 | Example 9 | Example 10 | Comparative Example 3 | Comparative Example 4 |
|---|---|---|---|---|---|---|---|---|---|
| Diamine (mol %) | MXDA: 100% | MXDA: 100% | MXDA: 100% | MXDA: 100% | MXDA: 80% PXDA: 20% | MXDA: 100% | MXDA: 100% | MXDA: 100% | MXDA: 80% PXDA: 20% |
| Spherulite density of skin portion (/mm$^2$) | 86000 | 86000 | 86000 | 98000 | 92000 | 86000 | 86000 | N/A | N/A |
| Spherulite density of core portion (/mm$^2$) | 25000 | 25000 | 24000 | 22000 | 24000 | 26000 | 21000 | N/A | N/A |
| Yellow index (YI) | −8 | −8 | −8 | −5 | −4 | −8 | −7 | −3 | −2 |
| [COOH]—[NH$_2$] (μeq/g) | 46 | 46 | 46 | 50 | 42 | 46 | 46 | 44 | 45 |
| Relative viscosity | 2.6 | 2.6 | 2.6 | 2.6 | 2.6 | 2.6 | 2.6 | 2.6 | 2.6 |
| Melting point (Tm) (° C.) | 239 | 239 | 239 | 239 | 253 | 239 | 239 | 239 | 253 |
| Pellet cross-sectional area (mm$^2$) | 6.4 | 9.3 | 12.0 | 6.4 | 6.4 | 4.2 | 14.5 | 6.4 | 6.4 |
| Pellet length (mm) | 3.0 | 3.0 | 3.0 | 3.0 | 3.0 | 3.0 | 3.0 | 3.0 | 3.0 |
| Motor load amplitude of twin screw extruder (A) | 0.3 | 0.3 | 0.3 | 0.3 | 0.3 | 0.3 | 0.3 | 0.3 | 0.3 |
| Motor load amplitude of first single screw extruder (A) | 0.54 | 1.54 | 2.10 | 0.48 | 0.51 | not extrudable | 4.50 | not extrudable | not extrudable |
| Motor load amplitude of second single screw extruder (A) | 8.70 | 10.30 | 12.20 | 7.50 | 8.20 | not extrudable | 19.70 | not extrudable | not extrudable |

MXDA: m-xylylenediamine,
PXDA: p-xylylenediamine,
N/A: not available

As is apparent from the above results, in Examples 4 to 10, since the spherulite density of the skin portion is large and the spherulites exist densely therein, the pellet is protected in the skin portion, and the yellow index YI of the obtained polyamide pellets can be made good. Furthermore, in Examples 4 to 10, in cases of molding using a twin screw extruder, the processability was good.

In addition, in Examples 4 to 8, by using a polyamide pellet in which the spherulites exist densely in the skin portion and the cross-sectional area of the pellet was made a certain value, even when a molded article was molded by a single screw extruder, a stable extrusion with a low motor load can be realized. Incidentally, in Examples 4 to 8, when using a second single screw extruder having a larger size, the motor load was increased, but the level is practically not a problem in the molding apparatus of such a size.

On the other hand, in Example 9, spherulites existed densely in the skin portion, but since the pellet cross-sectional area was small, when using a single screw extruder, the pellets winded around the screw to fail to be extruded. In addition, also in Example 10, spherulites existed densely in the skin portion, but since the pellet cross-sectional area was large, when using a single screw extruder, the motor load was increased to fail to realize stable extrusion.

Furthermore, in Comparative Examples 3, 4, even when being observed by ion milling, a pattern based on spherulites could not been sufficiently confirmed both in the skin portion and in the core portion, and the spherulite density could not be measured. In such polyamide pellets, however, spherulites are not clearly formed, and if present, do not exist densely. In Comparative Examples 3, 4, since spherulites did not exist densely as described above, the pellet was not sufficiently protected, and when using a single screw extruder, the pellets fuse with one another to fail to be extruded. Further, in Comparative Examples 3, 4, the yellow index YI of the obtained polyamide pellets cannot be made good.

The invention claimed is:

1. A polyamide pellet comprising a polyamide including diamine units and dicarboxylic acid units, 50% by mole or more of the diamine units being derived from m-xylylenediamine, wherein a spherulite density of a skin portion of the pellet being 40,000 to 250,000/mm$^2$, wherein the polyamide pellet is obtained by a method comprising:
    extruding and drawing out the polyamide in a molten state into a strand form,
    cutting the polyamide in the molten state drawn in strand form while cooling with water to pelletize the polyamide,
    further cooling the pelletized polyamide with water for 4 seconds or more, and
    subjecting the further cooled and pelletized polyamide to solid-phase polymerization to obtain the polyamide pellet.

2. The polyamide pellet according to claim 1, wherein a spherulite density of a core portion of the pellet is 10,000 to 40,000/mm$^2$.

3. The polyamide pellet according to claim 1, wherein 50% by mole or more of the dicarboxylic acid units in the polyamide are derived from an aliphatic dicarboxylic acid having 6 to 12 carbon atoms.

4. The polyamide pellet according to claim 3, wherein the aliphatic dicarboxylic acid having 6 to 12 carbon atoms is adipic acid, sebacic acid, or a mixture thereof.

5. The polyamide pellet according to claim 1, which satisfies a condition of the following formula (1):

$$-110 \ \mu eq/g \leq ([COOH]-[NH_2]) \leq 110 \ \mu eq/g \quad (1)$$

wherein [COOH] represents a terminal carboxyl group concentration (μeq/g) of the polyamide and [NH$_2$] represents a terminal amino group concentration (μeq/g) of the polyamide.

6. The polyamide pellet according to claim 1, which has a relative viscosity of 2.0 to 4.2.

7. The polyamide pellet according to claim 1, wherein the spherulite density of the skin portion is 80,000 to 110,000/mm$^2$.

8. The polyamide pellet according to claim 1, which is obtained by solid-phase polymerization of a pelletized polyamide being in an amorphous state.

9. The polyamide pellet according to claim 8, wherein the pelletized polyamide being in the amorphous state is one obtained by melt polycondensation.

10. The polyamide pellet according to claim 1, which has a cross-sectional area of 5 to 13 mm$^2$.

11. The polyamide pellet according to claim 10, which is a polyamide pellet for high compression screw molding which is to be kneaded and molding-processed by a single screw extruder having a compression ratio of 2.0 to 4.0.

12. A method for producing a polyamide molded article, in which the polyamide pellets according to claim 10 are kneaded and then molding-processed to obtain the polyamide molded article, wherein
    the polyamide pellets are kneaded in a cylinder having a single screw therein.

13. The method for producing a polyamide molded article according to claim 12, wherein a compression ratio in the cylinder is 2.0 to 4.0.

14. The method for producing a polyamide molded article according to claim 12, wherein
    the screw comprises a feeding part, a compression part following the feeding part, and a metering part following the compression part, and
    the feeding part, the compression part, and the metering part have lengths, with the total sum thereof converted to 1, of 0.40 to 0.55, 0.10 to 0.30, and 0.10 to 0.40, respectively.

15. A method for producing polyamide pellets, comprising the steps of:
    extruding a polyamide in a molten state into a strand form, the polyamide being obtained by polycondensation of a diamine containing m-xylylenediamine in 50% by mole or more and a dicarboxylic acid,
    cutting the polyamide extruded into the strand form while cooling with water to pelletize the polyamide, and then further cooling the pelletized polyamide with water for 4 seconds or more, and
    subjecting the pelletized polyamide after water cooling further to solid-phase polymerization to obtain the polyamide pellets.

16. The method for producing polyamide pellets according to claim 15, wherein the pelletized polyamide at the end of the water cooling has a temperature of 65° C. or lower.

17. The method for producing polyamide pellets according to claim 15, wherein the polyamide extruded into the strand form is cut to be pelletized within 2 seconds after landing on the water.

* * * * *